(12) United States Patent
Cross

(10) Patent No.: US 11,060,808 B2
(45) Date of Patent: Jul. 13, 2021

(54) MAGAZINE COUPLER

(71) Applicant: 1065210 B.C. Ltd., Abbotsford (CA)

(72) Inventor: David Cross, Abbotsford (CA)

(73) Assignee: 1065210 B.C. LTD., Abbotsford (CA)

( * ) Notice: Subject to any disclaimer, the term of this patent is extended or adjusted under 35 U.S.C. 154(b) by 273 days.

(21) Appl. No.: 16/341,697

(22) PCT Filed: Oct. 13, 2017

(86) PCT No.: PCT/CA2017/051221
§ 371 (c)(1),
(2) Date: Apr. 12, 2019

(87) PCT Pub. No.: WO2018/068149
PCT Pub. Date: Apr. 19, 2018

(65) Prior Publication Data
US 2019/0293374 A1    Sep. 26, 2019

(30) Foreign Application Priority Data

Oct. 13, 2016  (CA) ................................ CA 2945223
Oct. 13, 2016  (CA) ................................ CA 2945224

(51) Int. Cl.
*F41A 9/63*    (2006.01)
*F41A 9/68*    (2006.01)
*F41A 9/70*    (2006.01)

(52) U.S. Cl.
CPC ............... *F41A 9/63* (2013.01); *F41A 9/68* (2013.01); *F41A 9/70* (2013.01)

(58) Field of Classification Search
CPC ...... F41A 9/63; F41A 9/68; F41A 9/70; F41A 9/71
(Continued)

(56) References Cited

U.S. PATENT DOCUMENTS 489,107 A * 1/1893 Storz ..................... F16L 37/252
                                                    285/73
3,191,332 A * 6/1965 Ardolino .................. F41A 9/63
                                                    42/50

(Continued)

FOREIGN PATENT DOCUMENTS

CN    204007329 U    12/2014
CN    104712866 A     6/2015

(Continued)

OTHER PUBLICATIONS

Examiner's Report issued for Canadian patent application No. 2,945,223, Canadian Intellectual Property Office, dated Feb. 9, 2017.

(Continued)

*Primary Examiner* — John Cooper
(74) *Attorney, Agent, or Firm* — Dentons Canada LLP

(57) ABSTRACT

The present disclosure provides apparatus for coupling an item to another item. The apparatus comprises a coupler mounted on the item and comprising a mating face having a plurality of catches thereon, the plurality of catches comprising at least one complementary pair of catches positioned and shaped to be engaged with corresponding catches of another coupler having an identical mating face when mating faces of two couplers are facewise engaged with and rotated relative to each other to align with each other. The coupler may be implemented as a floor plate of a magazine, as a clip, or in other forms.

22 Claims, 20 Drawing Sheets

(58) Field of Classification Search
USPC .......................................................... 42/50
See application file for complete search history.

(56) References Cited

U.S. PATENT DOCUMENTS

| | | | |
|---|---|---|---|
| 3,709,526 A | | 1/1973 | Cromie |
| 4,397,453 A | | 8/1983 | Seecamp |
| 4,447,976 A | * | 5/1984 | Cooper ..................... F41A 9/63 |
| | | | 42/18 |
| 4,484,403 A | * | 11/1984 | Schwaller .......... B65D 21/0204 |
| | | | 42/50 |
| 4,685,238 A | * | 8/1987 | Schoepflin ............ F16B 5/0004 |
| | | | 42/90 |
| 5,279,059 A | * | 1/1994 | Howard .................... F41A 9/63 |
| | | | 42/50 |
| 5,615,506 A | * | 4/1997 | Jackson .................... F41A 9/63 |
| | | | 42/50 |
| 6,668,479 B1 | * | 12/2003 | Obong ...................... F41A 9/63 |
| | | | 206/3 |
| 7,073,285 B2 | * | 7/2006 | Obong .................... F42B 39/02 |
| | | | 224/931 |
| 8,322,065 B2 | * | 12/2012 | Faifer ....................... F41A 9/63 |
| | | | 42/90 |
| D720,422 S | | 12/2014 | Fitzpatrick et al. |
| 9,175,923 B2 | * | 11/2015 | Ruby ........................ F41A 9/64 |
| 10,094,630 B1 | * | 10/2018 | Loveday, IV ............. F41A 9/65 |
| 10,126,076 B2 | * | 11/2018 | Klein ........................ F41A 9/63 |
| 10,345,063 B1 | * | 7/2019 | Taylor ....................... F41A 9/65 |
| 10,921,079 B1 | * | 2/2021 | Full ......................... F41A 17/38 |
| 2011/0107645 A1 | | 5/2011 | Faifer |
| 2016/0003567 A1 | * | 1/2016 | Purkiss ..................... F41A 9/68 |
| | | | 42/49.01 |
| 2016/0033220 A1 | * | 2/2016 | Grandy ..................... F41A 9/63 |
| | | | 42/49.01 |
| 2019/0293374 A1 | * | 9/2019 | Cross ........................ F41A 9/68 |

FOREIGN PATENT DOCUMENTS

| | | |
|---|---|---|
| DE | 20214463 U1 | 1/2003 |
| GB | 1568210 A | 5/1980 |

OTHER PUBLICATIONS

International Search Report and Written Opinion for PCT/CA2017/051221, International Searching Authority, dated Jan. 30, 2018.

Extended European Search Report and Search Opinion issued in connection with European patent application No. EP 17859853.8, European Patent Office, dated Aug. 10, 2020.

Supplementary Partial European Search Report and Provisional Opinion issued in connection with European patent application No. EP 17859853.8, European Patent Office, dated Apr. 8, 2020.

Search Report issued in connection with related Chinese patent application No. 201780076066.0, China National Intellectual Property Administration, dated Feb. 23, 2021.

Office Action issued in connection with related Chinese patent application No. 201780076066.0, China National Intellectual Property Administration, dated Mar. 8, 2021.

\* cited by examiner

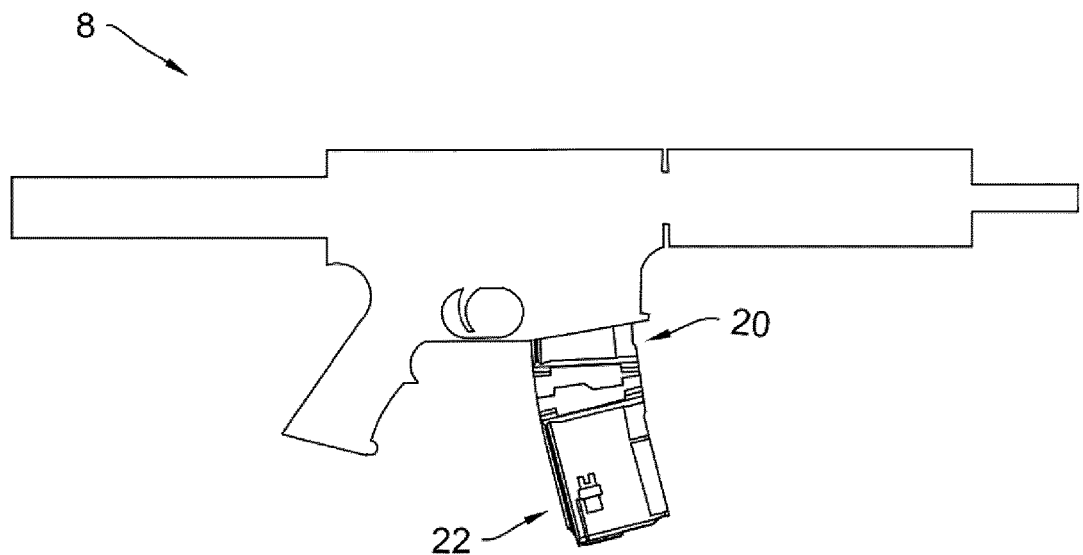
FIG. 1
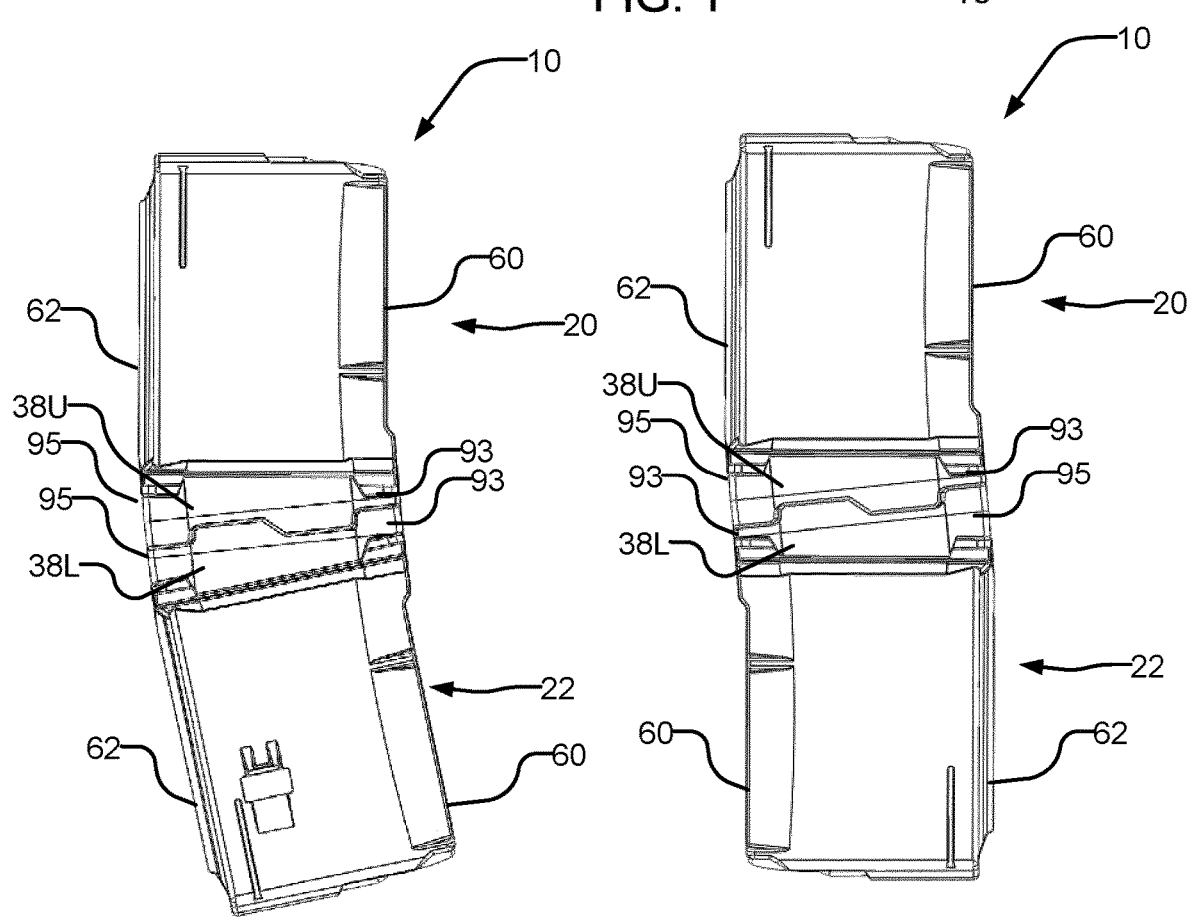
FIG. 2
FIG. 3

MAGAZINE COUPLER

CROSS-REFERENCE TO RELATED APPLICATIONS

This application claims the benefit of priority of Canadian Patent Application No. 2,945,224, and Canadian Patent Application No. 2,945,223, both of which were filed on Oct. 13, 2016, and are hereby incorporated herein by reference in their entirety.

TECHNICAL FIELD

The present invention relates generally to apparatus for coupling two elements together. Particular embodiments provide magazine coupling devices for connecting magazines together.

BACKGROUND

Many firearms use a magazine to store and feed ammunition. Magazines are available in a variety of shapes and sizes, with the detachable box magazine being most common. A detachable box magazine can be loaded or unloaded when detached from the corresponding firearm. As necessary, an empty magazine can be detached from the firearm and replaced with another loaded magazine.

A basic box magazine commonly comprises an outer case into which the ammunition is loaded, a feed mechanism, which includes a compression spring with a follower, a spring plate and a floor plate. Ammunition is loaded into the magazine, above the follower, compressing the spring. As ammunition is used, the spring provides an expansive force between the floor plate/spring plate (depending on magazine design and the follower, raising the ammunition within the magazine and into the firearm.

When the ammunition in one magazine has been depleted, the operator may require efficient replacement of the magazine with another loaded magazine, with little delay in operation of the firearm. Typically, the operator carries additional loaded magazines. The extra magazines may be contained within pockets of a bandolier, either around the waist or over the shoulder and across the body, or within a supplementary container. The operator must extract a loaded magazine from its storage location and engage it with the firearm following removal of the spent magazine. The act of removing a fresh magazine from its storage location may cause an undesirable delay in firearm action.

To reduce the delay between extracting the spent magazine and engaging a fully loaded magazine, previous devices have been utilized to couple two magazines together, such that a fully loaded magazine is attached to the engaged magazine and is readily at hand when the engaged magazine is depleted of ammunition. Although there remains a delay in firearm use as one magazine is removed and another engaged, this arrangement eliminates the additional delay caused by extracting a loaded magazine from a storage location, thereby improving firearm efficiency.

Previous attempts have been made to permit two magazines to be connected together. Such attempts, however, have not been satisfactory. In particular, some devices utilize a modified base plate with protruding studs and receiving apertures to engage the opposing studs of the coupled magazine. Such arrangements require precise placement of the two magazines to engage the coupling method, and studs can catch and break. Additionally, this method of coupling allows just one arrangement of the magazines, such that the ammunition in one magazine is aligned in the opposite direction to the second magazine, without the option to modify the angle between the two magazines. Such arrangement may not be optimal for all operators. Examples of such devices may be found in U.S. Pat. No. 3,191,332 to Ardolino, for example.

Other devices require the magazine to have a protruding base plate, or to utilize a threaded rod to couple the two magazines. Such designs can be cumbersome to engage, and may easily be damaged by dirt and debris. Examples of such designs may be found in U.S. Pat. No. 4,685,238 to Schoepflin, for example.

SUMMARY

According to a first embodiment of the present invention there is disclosed apparatus for coupling two items together comprising first and second couplers, each attached to one of the elements. Each coupler comprises a mating face having a plurality of catches positioned and shaped to be engaged with each other when two identical mating faces are facewise engaged with and rotated relative to each other to align with each other. In some embodiments each coupler is provided in the form of a floor plate adapted to be secured to a bottom of each of two magazines. In some embodiments the coupler is provided in the form of a separate element attached to a magazine floor plate. In some embodiments, the coupler is provided in the form of a clip attachable to the outside of a magazine casing.

In some embodiments, the catches are symmetrically arranged such that two couplers are attachable to each other in one of two opposed alignments. The catches may comprise an inwardly pointing catch and an outwardly pointing catch at each of two opposed ends of the coupler.

In some embodiments, the catches are arranged around a central axis extending perpendicularly to said mating face. The catches may be arranged in pairs diagonally across said central axis from each other. At least one pair of said catches may comprise inwardly extending catches having engagement surfaces extending radially outwardly from said central axis, and at least one pair of said catches may comprise outwardly extending catches having engagement surfaces extending radially outwardly from said central axis. The inwardly extending catches may engage with a corresponding outwardly extending catch across a longitudinal centerline of said floor plate in a first configuration and with a corresponding outwardly extending catch across a transverse centerline of said floor plate in a second configuration.

In some embodiments, the mating face comprises peripheral ridge portions collectively extending around half of a periphery of the coupler such that the peripheral ridge portions of a pair of couplers coupled together collectively extend around all of a periphery of an interface between the pair of couplers. The mating face may comprise a central surface and a pair of outer surfaces with one outer surface at each of two opposed ends of the mating face, wherein the outer surfaces are parallel to and offset relative to the central surface to facilitate alignment of the mating face with the mating face of another coupler.

In some embodiments, the coupler comprises a floor plate adapted to be secured to a bottom of a magazine body. The floor plate may have a top surface for bearing against a magazine spring plate and a bottom surface comprising the mating face. The top and bottom surfaces of said floor plate may have an angle therebetween in the range of 1 to 45 degrees. The floor plate may be adapted to be slidably received upon a bottom end of a casing of the magazine. The floor plate may include horizontally opposed ridges adapted to be received within slots on said magazine. The floor plate may retain a spring plate within the magazine body. The floor plate may include at least one aperture adapted to receive a protrusion extending from said spring plate therein so as to retain said floor plate on said magazine body.

In some embodiments, the coupler comprises a clip adapted to clip onto an outside of a magazine body. The clip may comprise a clip body having a first side for bearing against the magazine body and a second side comprising the mating face, wherein a clip arm extends from the first side of the clip body at each of two opposed ends of the clip body. A central portion of the clip body may comprise a thin area providing flexibility to the clip body to permit the clip arms to be pulled apart to fit over the magazine body. The mating face may comprise two central peripheral ridge portions each extending partially across a central portion of the mating face, the central portion of the mating face being aligned with the central portion of the clip body, such that when two clip bodies are coupled together they are not flexible. The clip arms may comprise inwardly extending protrusions at ends thereof configured to be received in grooves in the outside of the magazine body to facilitate indexing of the clip at any of a plurality of positions along a length of the magazine body.

According to a further embodiment of the present invention there is disclosed a magazine comprising a magazine body extending between top and bottom ends having an interior passage therein extending to an open end at the bottom of the magazine body and a follower slidably located within the interior passage of the magazine body. The magazine further comprises a magazine spring located within the interior passage of the magazine body below the follower, a spring plate sized to be slidably received within the interior passage of the magazine body and a floor plate slidably receivable upon the bottom of the magazine body. The floor plate comprises a mating face including a plurality of catches positioned and shaped to be engaged with a corresponding mating face of a floor plate of an adjacent magazine when two floor plates are facewise engaged with and rotated relative to each other to align with each other in one of two opposed alignments.

The magazine body may include slots extending transversely to a longitudinal axis at a position proximate to the bottom end thereof adapted to engage corresponding ridges in the floor plate. The spring plate may include at least one protrusion extending therefrom adapted to be received in at least one corresponding depression in the floor plate.

According to a further embodiment of the present invention there is disclosed a method for coupling two magazines together comprising mating a mating face on a bottom surface of a floor plate attached to the magazine with a corresponding floor plate of an adjacent magazine and rotating the magazine relative to the adjacent magazine so as to engage corresponding catches extending from each mating face on the bottom surface of the floor plate of the magazine and the adjacent magazine to align with each other in one of two parallel alignments.

The method may further comprise slidably engaging the floor plate upon a bottom of the magazine body in a direction transverse to a length of the magazine body. The method may further comprise providing a magazine body extending between top and bottom ends having an interior passage therein extending to an open end at the bottom of the magazine body and slidably locating a follower within the interior passage of the magazine body. The method may further comprise slidably locating a magazine spring within the interior passage of the magazine body below the follower and slidably locating a spring plate within the interior passage of the magazine body below the spring.

Other aspects and features of the present invention will become apparent to those ordinarily skilled in the art upon review of the following description of specific embodiments of the invention in conjunction with the accompanying figures.

DRAWINGS

The following figures set forth embodiments in which like reference numerals denote like parts. Embodiments are illustrated by way of example and not by way of limitation in the accompanying figures.

FIG. 1 is a side diagrammatic view of a firearm with two attached coupled magazines with floor plate couplers according to one embodiment of the present invention.

FIG. 2 is a side view of two coupled magazines, with the couplers and the magazines aligned in the same direction.

FIG. 3 is a side view of two coupled magazines, with the couplers aligned in opposite directions.

DETAILED DESCRIPTION

Figure 2A:
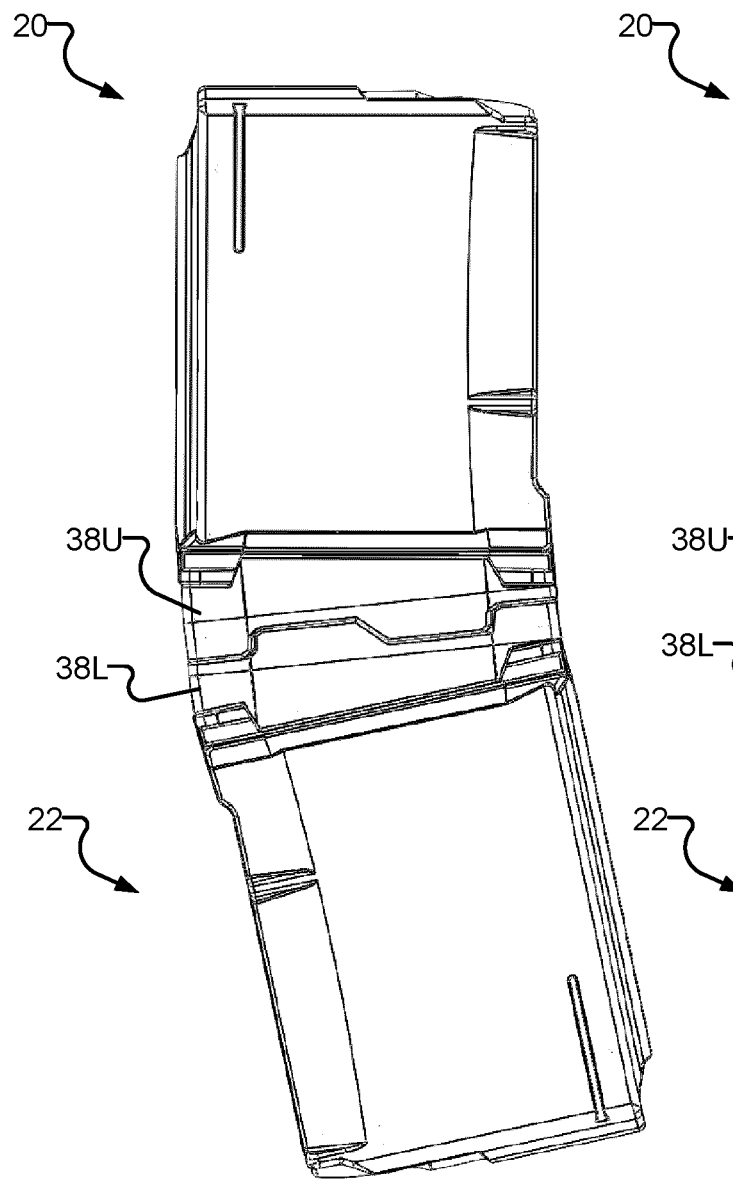
FIG. 2A is a side view of two coupled magazines, with the couplers aligned in the same direction and the magazines aligned in opposite directions.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The present disclosure provides apparatus for coupling two elements together. The embodiments of the illustrated examples relate to coupling magazines for firearms, but other embodiments may provide couplers for coupling other things. A coupler is attached to each element to be coupled, and each coupler has a mating face with a plurality of catches thereon configured to securely engage the catches of an identical mating face of another coupler to couple the elements together. The examples discussed below with reference to FIGS. 1-16 provide a coupler in the form of a floor plate of a magazine, and the examples of FIGS. 17-20 provide a coupler in the form of a clip attached to the side of a magazine. The coupler may be provided in other forms in other embodiments, such as, for example, a separate element glued or otherwise attached to a magazine or other element, a sleeve that fits around a magazine or other element, or the coupler may be integrated into the body of a magazine or other element.

Referring to FIG. 1, a firearm with attached coupled magazines 10 is generally shown at 8. FIG. 2 shows a side view of the coupled magazines 10, and FIG. 3 shows an alternate configuration of coupled magazines 10. The alternate configurations of coupled magazines will be described in more detail below. In FIG. 1, top magazine 20 is engaged with the firearm 8. Bottom magazine 22 is not engaged with the firearm 8, but is coupled to top magazine 20, for future use or storage, as will be described in more detail below. Top magazine 20 and bottom magazine 22 may be identical, but are identified separately to differentiate between the engaged top magazine 20 and the disengaged bottom magazine 22.

Figure 4:
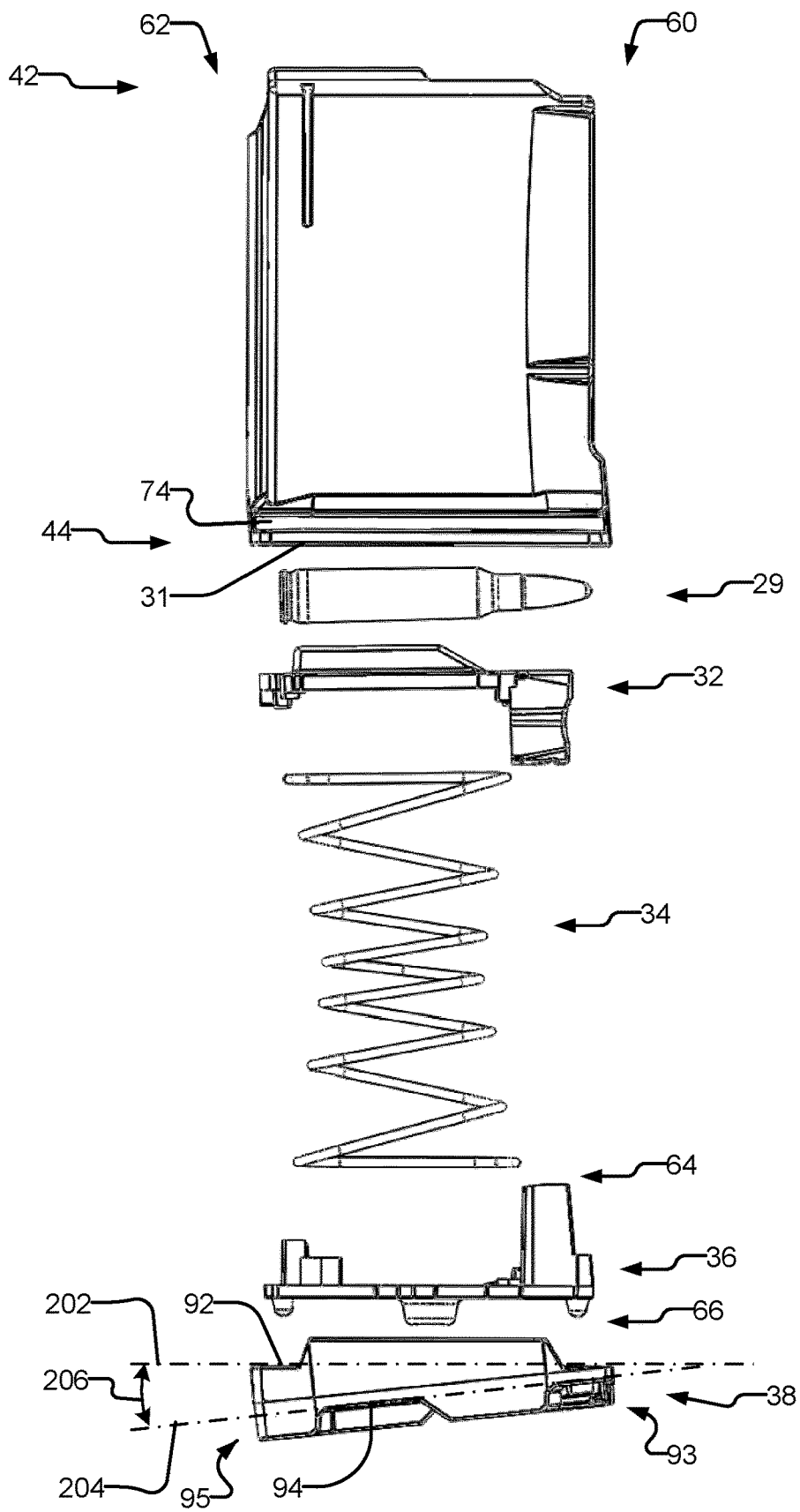
FIG. 4 is an exploded view of one magazine according to one embodiment of the present invention.
Figure 4A:
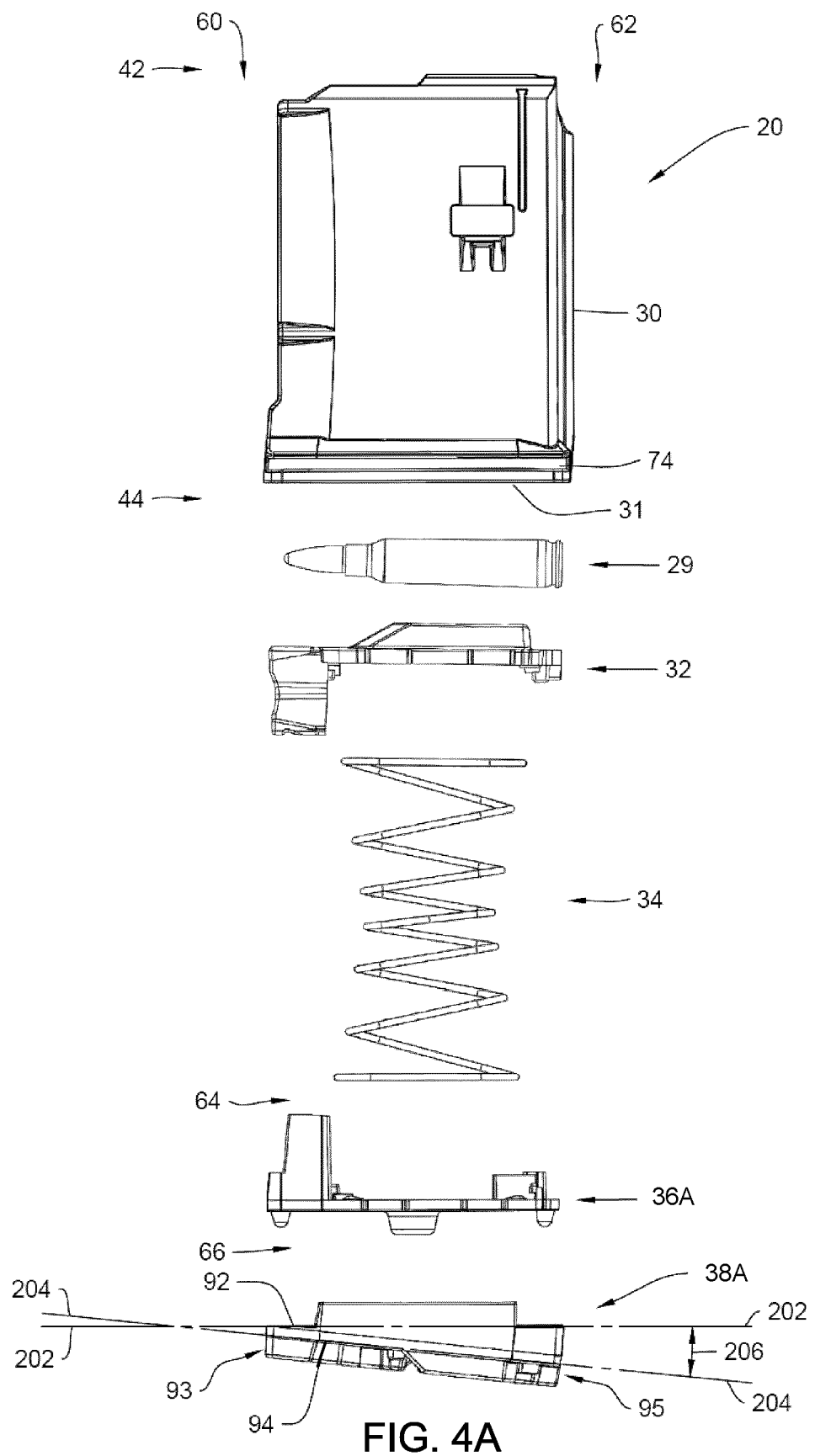
FIG. 4A is an exploded view of one magazine according to another embodiment of the present invention.

FIG. 4 illustrates an exploded side view of one of the magazines 20. As noted above, bottom magazine 22 may be identical to top magazine 20. Magazine 20 is comprised of a magazine body 30 having a follower 32, spring 34, spring plate 36 therein and a floorplate 38 secured to a bottom thereof. FIGS. 5, 6, 7, 8, 9, 10, 11 and 12 show further details of various elements of the magazine of FIG. 4. FIG. 4A illustrates an exploded side view of a magazine 20 which is substantially similar to the magazine of FIG. 4, except with alternate configurations of the spring plate 36A and floor plate 38A. FIGS. 5A, 6A, 7A, 8A, 9A, 10A, and 11A show further details of various elements of the magazine of FIG. 4A. The magazine body 30 extends between front and rear ends 60 and 62, respectively, corresponding to the front and rear edges of the ammunition 29 stored therein. The magazine body 30 comprises a box container extending between top and bottom ends 42 and 44, respectively and first and second sides 70 and 72, respectively, as seen on FIG. 5/5A, with a cavity 24 therein, as seen on FIG. 6/6A.

To assemble the magazine 20, a plurality of ammunition 29 is fed in from the top end 42, and the follower 32, spring 34 and spring plate 36 are inserted in order into the cavity 24 in the magazine body 30 through an opening 31 in the bottom end 44 thereof, compressing spring 34. The floorplate 38, having top and bottom surfaces 92 and 94, respectively, and first and second ends, 93 and 95, respectively, is then attached to the magazine body 30, as will be described in more detail below, to retain the follower 32, spring 34 and spring plate 36 therein. The floorplate 38 has top and bottom planes 202 and 204 corresponding generally to the top and bottom surfaces 92 and 94, respectively, which are separated by a coupler plane angle 206 such as ranging from 0 to 90 degrees, or more preferably from 1 to 45 degrees, or in some embodiments from 1 to 30 degrees, the purpose of which will be further described below.

Figure 5:
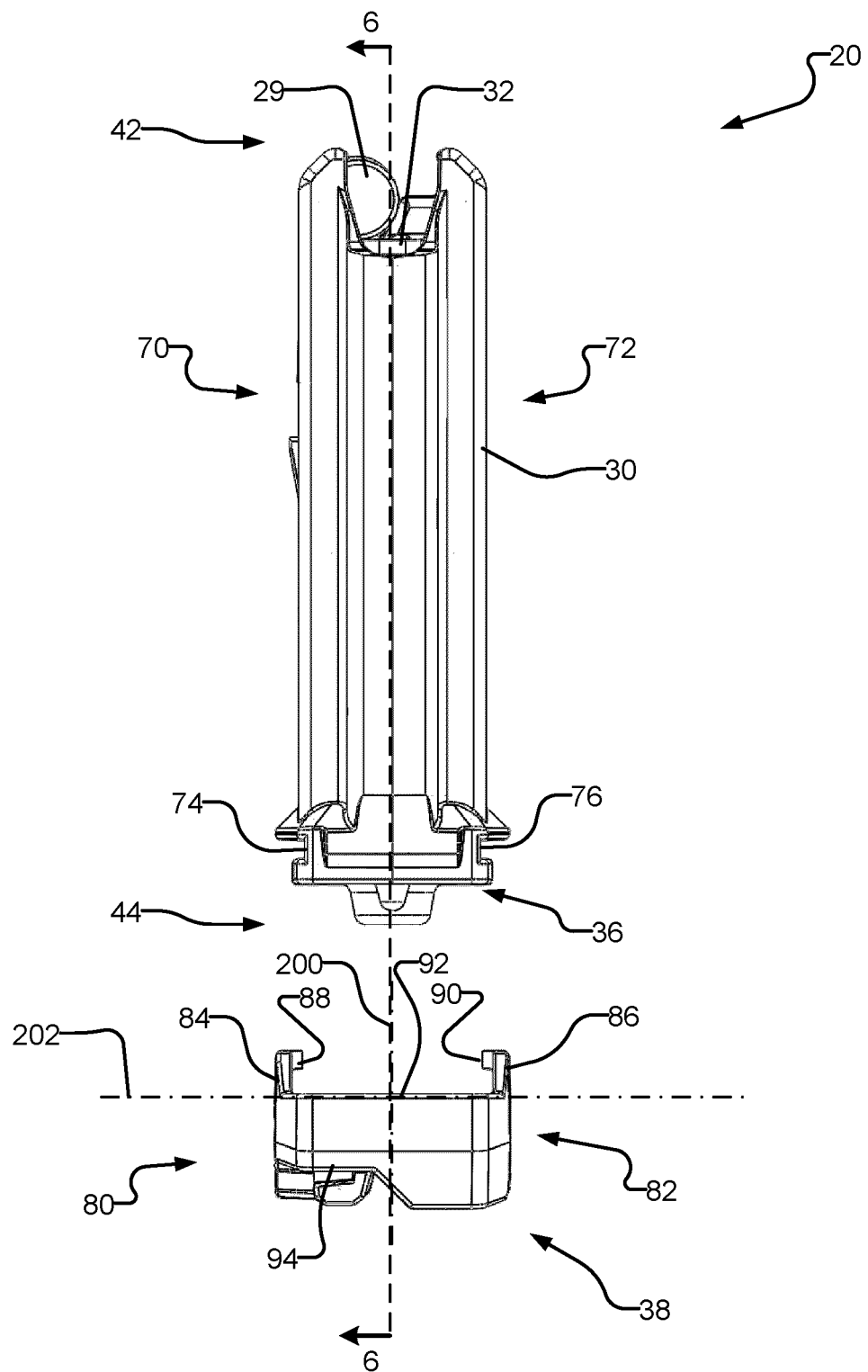
FIG. 5 is an exploded end view of the magazine of FIG. 4.
Figure 5A:
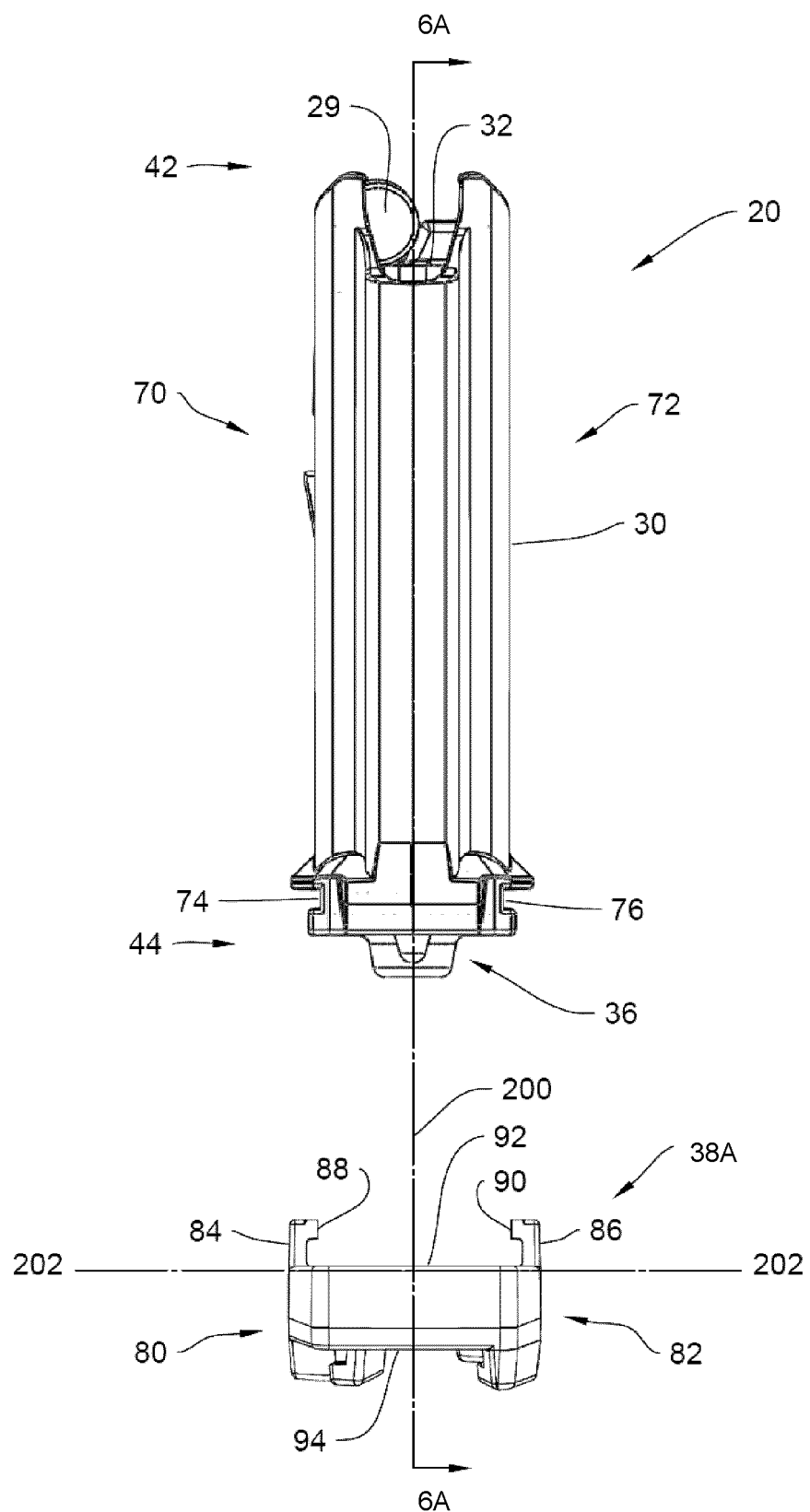
FIG. 5A is an exploded end view of the magazine of FIG. 4A.

Turning now to FIG. 5/5A, the floor plate 38/38A has first and second sides 80 and 82, respectively. As illustrated in FIG. 5/5A, the follower 32, spring 34 (not shown) and spring plate 36/36A have been previously inserted into magazine body 30. With a single ammunition 29 in the magazine body 30, the follower 32 is positioned proximate to the top end 42 of the magazine body 30. Spring plate 36/36A is positioned proximate to the bottom end 44 of the magazine body 30. To retain the assembly together, the floorplate 38/38A may be secured to the magazine body 30 over the spring plate 36, which will be more fully set out below. The bottom of the floor plate 38/38A comprises a mating face configured for coupling to another identical mating face in one of two opposed alignments. The floor plate 38A of FIG. 5A is substantially similar to the floor plate 38 of FIG. 5, except that the mating face is differently configured, as discussed below with reference to FIGS. 11A and 11B.

Figure 6:
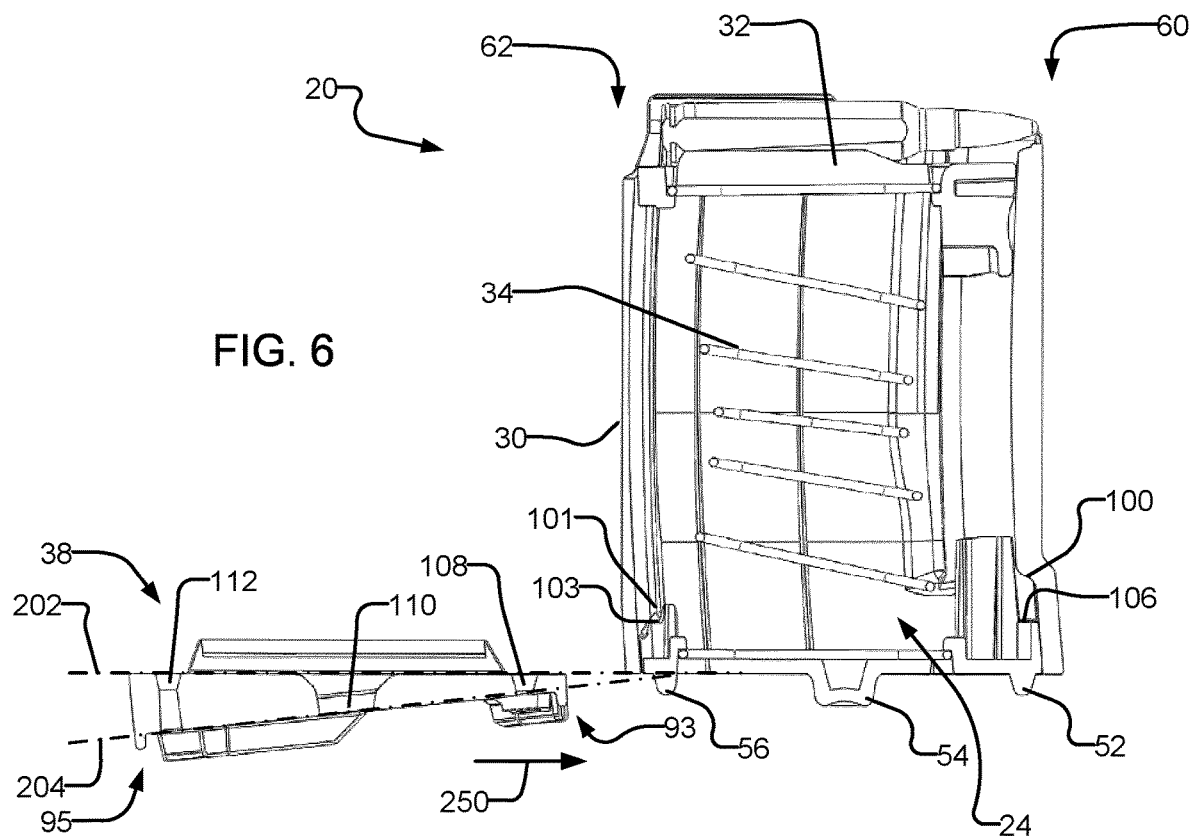
FIG. 6 is a cross section taken along line 6-6 of the magazine of FIG. 5, with the floor plate disengaged.
Figure 10:
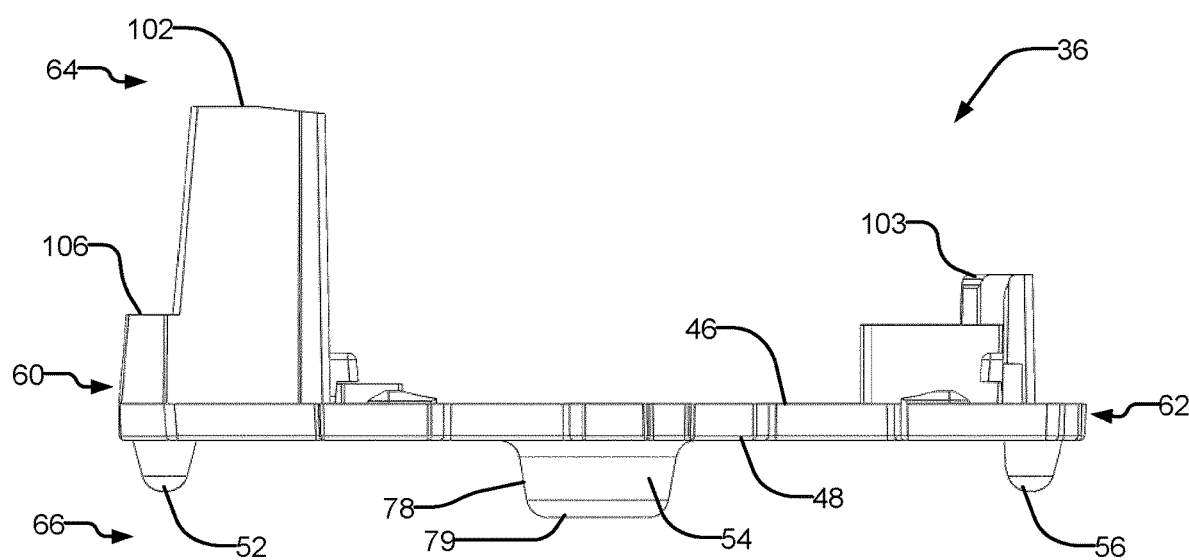
FIG. 10 is a side view of the spring plate of FIG. 4.
Figure 9A:
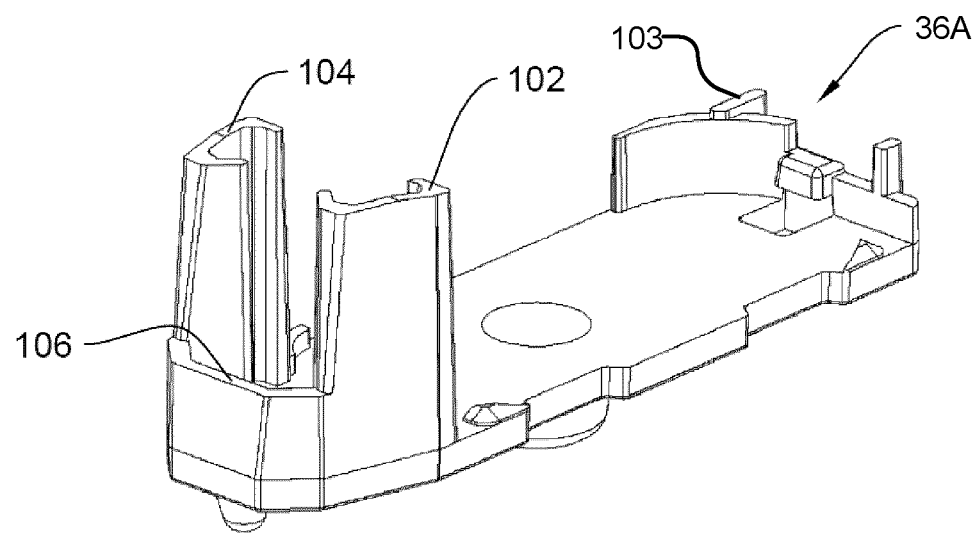
FIG. 9A is a perspective view of the top of the spring plate of FIG. 4A.
Figure 10A:
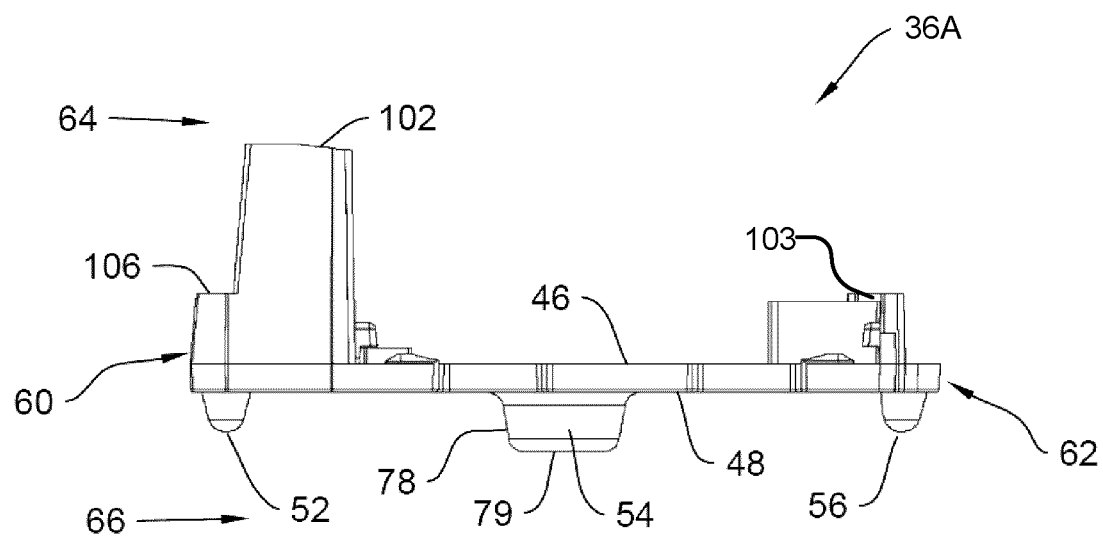
FIG. 10A is a side view of the spring plate of FIG. 4A.

Turning now to FIG. 10/10A, the spring plate 36/36A extends between front and rear ends 60 and 62, respectively, top and bottom 64 and 66, respectively, and top and bottom surfaces 46 and 48, respectively. The spring plate 36/36A has a length between the front and rear ends 60 and 62 and a width sized to be slidably received within the cavity 24, as illustrated in FIG. 6/6A. As illustrated in FIG. 10/10A, the spring plate 36/36A includes a plurality of protrusions extending from the bottom surface 48 thereof. In particular, a front protrusion 52 is located proximate to the front end 60, and a rear protrusion 56 is located proximate to the rear end 62. Furthermore, a central protrusion 54 extending from the bottom surface 48 and is centered between the front and rear protrusions, 52 and 56. The front and rear protrusions, 52 and 56, are generally conical in shape with a rounded tip, and the central protrusion 54 is generally frustoconical in shape, with a curved transition between the central protrusion side 78 and central protrusion end surface 79. The purpose of this curved transition will be described in more detail below.

As best seen in FIGS. 6/6A and 7/7A, the length of magazine body 30 at the bottom end 44 extending between front end 60 and rear end 62, may be longer than at the top end 42 as is commonly known. An angled shoulder 100 within magazine body 30 at the front end 60 reduces the length of the cavity 24 of magazine body 30 thereabove. When the spring plate 36/36A is positioned within the bottom portion of the cavity 24, positioning guides 102 and 104, as best seen on FIG. 9/9A, are positioned to fit within the narrower portion of cavity 24 above the shoulder 100, whereas a top edge 106 at the front of the spring plate 36 fits within the wider bottom portion of cavity 24, restricting upward movement of the positioning guides 102 and 104 of the spring plate 36/36A past the shoulder 100 within the bottom portion of the cavity 24. The spring plate 36 of FIGS. 9 and 10 differs from the spring plate 36A of FIGS. 9A and 10A in that spring plate 36 of FIGS. 9 and 10 includes another positioning guide 103 at its rear end 62. The magazine body 30 shown in FIG. 6 also includes another angled shoulder 101 to restrict upward movement of the positioning guide 103 of the spring plate 36. The spring plate 36/36A can move upwards within the cavity 24 such that the tips of all protrusions, 52, 54 and 56, can be fully contained within the cavity 24 while the floorplate 38/38A is being attached to the magazine body 30, as will be described below.

As seen in FIG. 5/5A, magazine body 30 has first groove 74 within the first side 70 proximate to the bottom end 44, and second groove 76 within the second side 72 and proximate to the bottom end 44. The two grooves 74 and 76 are aligned with each other and extend the full length of the magazine body 30, from front end 60 to rear end 62, as seen on FIG. 4/4A. The purpose of this groove will be described in more detail below.

FIGS. 5/5A and 8/8A best illustrate the top of floor plate 38/38A. The tops of floor plates 38 and 38A are substantially similar. Extending upwards from top plane 202 on first and second sides 80 and 82 are first and second upstanding walls 84 and 86, respectively. First upstanding wall 84 has a first inward facing ridge 88 on a distal end thereof, and the second upstanding wall 86 has a second inward facing ridge 90 on a distal end thereof. The two walls with inward facing ridges are equivalently sized, and are mirrored about centreline 200. The first and second inward facing ridges 88 and 90 are positioned such that they can be engaged with first and second grooves 74 and 76 of magazine body 30. First end, middle and second end apertures or bores, 108, 110 and 112, respectively, are positioned along the centreline 200, to correspond to the protrusions on the spring plate 36/36A. As illustrated, the bores 108, 110 and 112 are substantially circular although it will be appreciated that other profiles may be useful as well. In particular, the first end aperture 108 is located proximate to the first end 93, the second end aperture 112 is located proximate to the second end 95 and the middle aperture 110 is located therebetween. First and second end apertures, 108 and 112, are sized and positioned to receive front and rear protrusions, 52 and 56, and middle aperture 110 is sized and positioned to receive central protrusion 54 of spring plate 36/36A. Both first and second end apertures, 108 and 112, are sized the same, such that they can each receive either front or rear protrusion, 52 or 56 to permit the floor plate 38/38A to be secured to the magazine body 30 from either direction.

Figure 8:
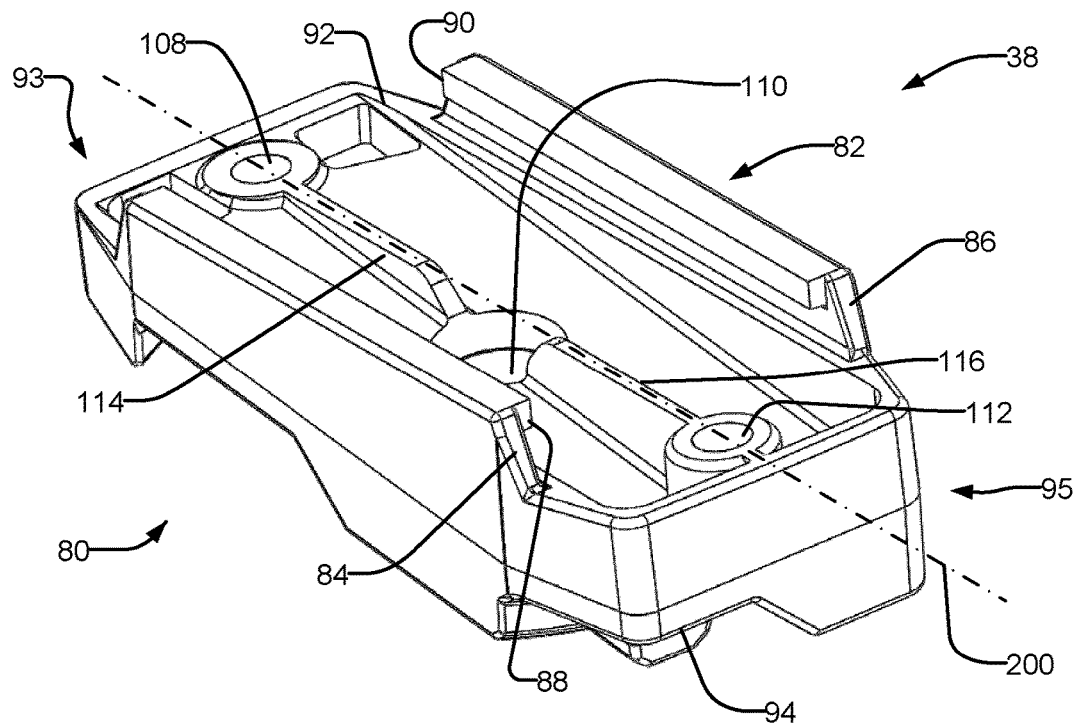
FIG. 8 is a perspective view of the top of the floor plate of FIG. 4.
Figure 8A:
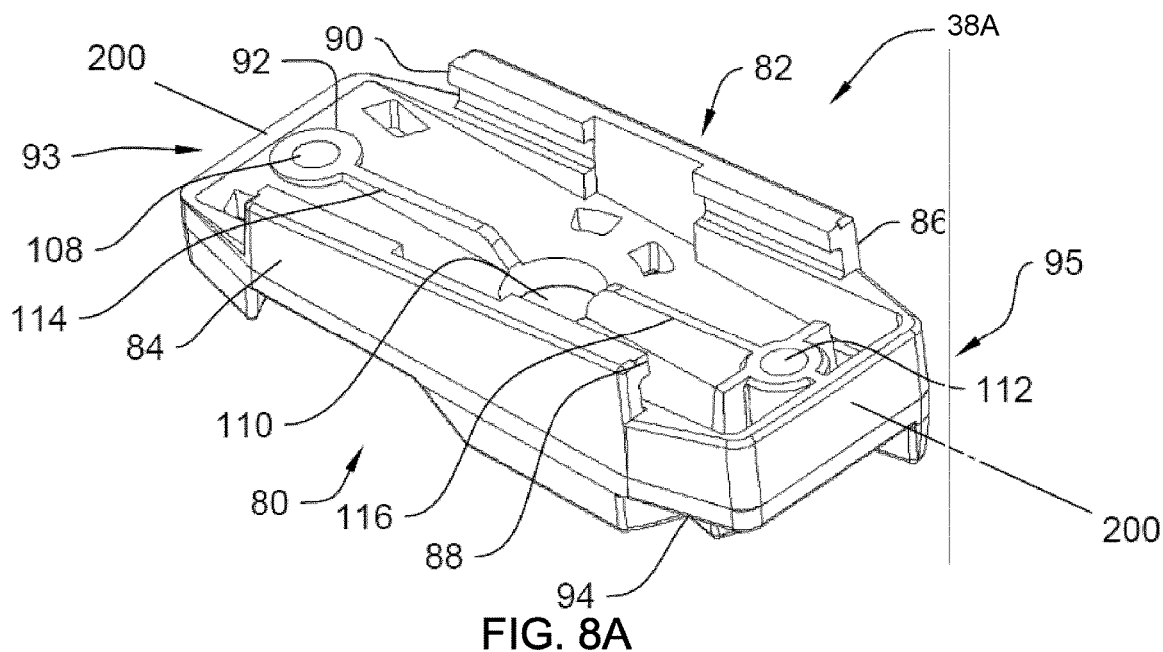
FIG. 8A is a perspective view of the top of the floor plate of FIG. 4A.
Figure 9:
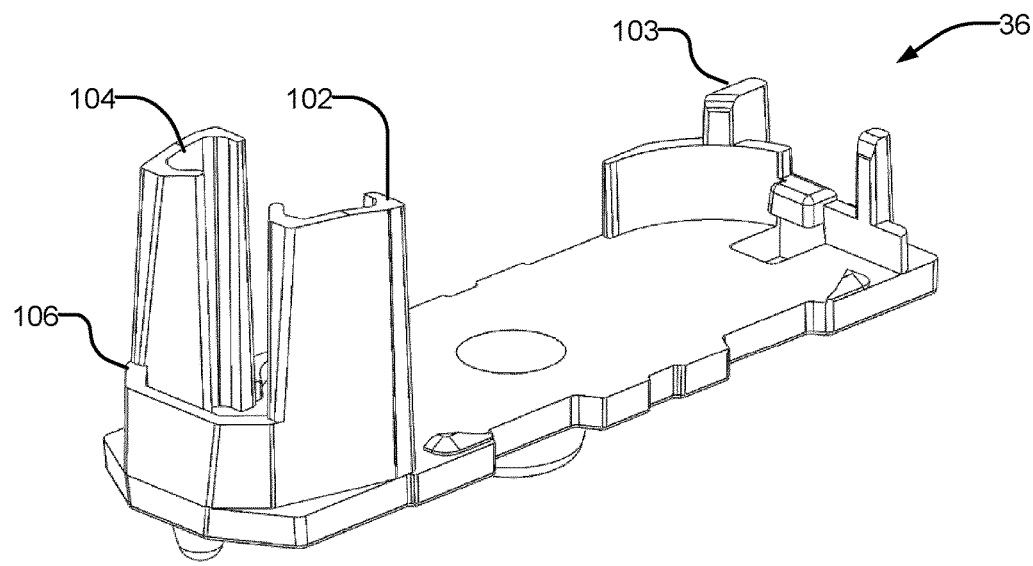
FIG. 9 is a perspective view of the top of the spring plate of FIG. 4.

As illustrated in FIG. 8/8A, a first ridge 114 extends along the centreline 200, from the first end aperture 108 to the middle aperture 110. A second ridge 116 extends from the second end aperture 112 to the middle aperture 110. Each of the first and second ridges include tapers down to the first end, middle and second end apertures 108, 110 and 112. It will be appreciated that although ridges are shown in the present embodiments of the invention, the first and second ridges, 114 and 116, could be eliminated and the floor plate 38/38A could be manufactured such that the material between bottom plane 204 and top plane 202 could be solid, with the first end, middle and second end apertures, 108, 110 and 112, remaining as illustrated, with tapered openings to permit engagement of the front, central and rear protrusions, 52, 54, 56, of the spring plate 36/36A.

Figure 7:
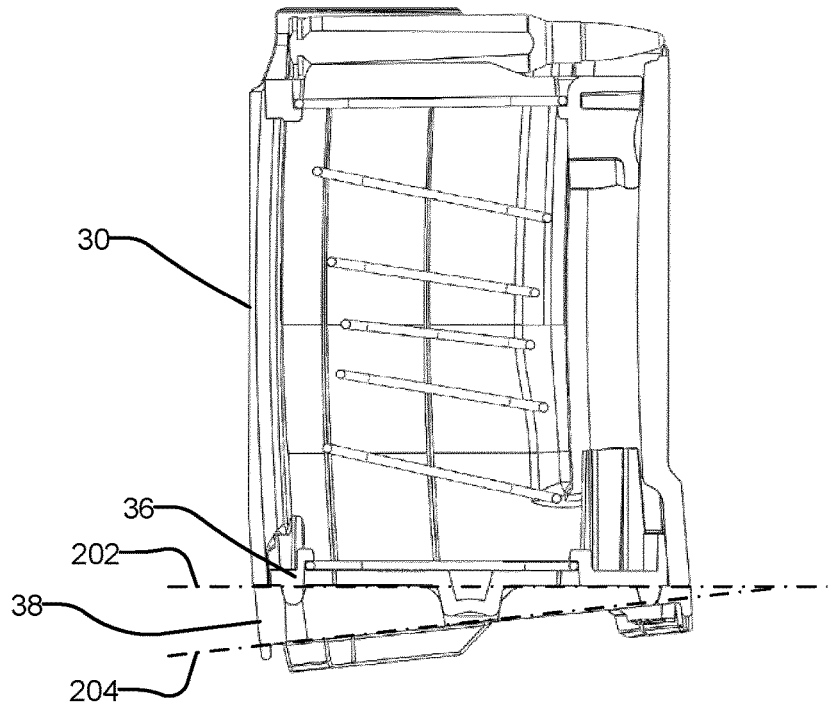
FIG. 7 is a cross section taken along line 6-6 of the magazine of FIG. 5, with the floor plate engaged.
Figure 6A:
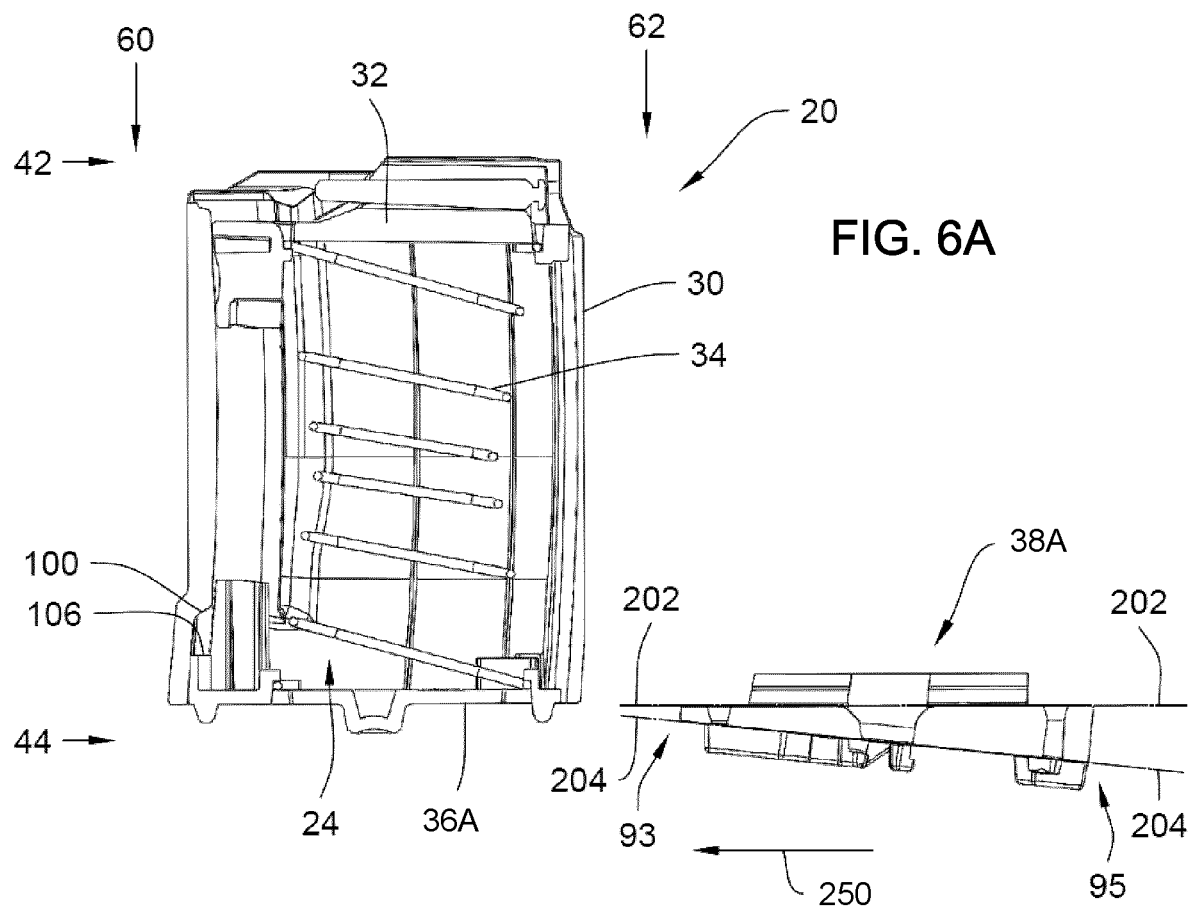
FIG. 6A is a cross section taken along line 6-6 of the magazine of FIG. 5A, with the floor plate disengaged.
Figure 7A:
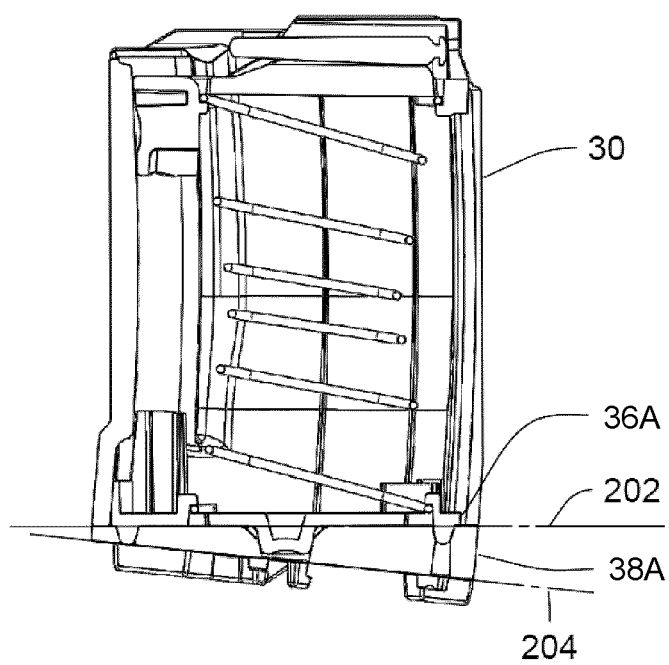
FIG. 7A is a cross section taken along line 6-6 of the magazine of FIG. 5A, with the floor plate engaged.

As illustrated in FIGS. 6/6A and 7/7A, the floor plate 38/38A can be attached to the magazine body 30 starting from either the front or rear end, 60 or 62. FIG. 6/6A illustrates the floor plate 38/38A beside the rear end 62, prior to attachment. As set out above, the floor plate 38/38A can be positioned with either the first end 93 or the second end 95 proximate to the rear end 62 of the magazine body 30. In particular, FIG. 6/6A illustrates the first end 93 proximate to the rear end 62, although the floor plate 38/38A could be oriented in the opposite direction. To assemble, the first and second inward facing ridges 88 and 90 of floor plate 38/38A are aligned with the first and second grooves 74 and 76 of the magazine body 30, and the floor plate 38/38A is slid onto the magazine body 30 in a direction generally indicated by arrow 250, parallel to top plane 202. As the floor plate 38/38A is slid into place, the three protrusions, 52, 54 and 56 of the spring plate 36/36A ride on the first and second ridges, 114 and 116 of floor plate 38/38A, thereby compressing the spring 34 and lifting the spring plate 36/36A within the cavity 24 of the magazine body 30. As the tops of the apertures 108, 110 and 112 are tapered, and the protrusions 52, 54 and 56 are similarly tapered, the protrusions can engage with the apertures when lateral force is applied along top plane 202 to the floor plate 38/38A as it is slid into place on the magazine body 30. When all protrusions, 52, 54, 56, are engaged with all apertures, 108, 110, 112, the floor plate 38/38A is correctly aligned and will remain in place until vertical force is applied to the central protrusion end surface 79 to disengage protrusions 52, 54 and 56, and additional lateral force is applied along the top plane 202, which will allow for removal of the floor plate 38/38A. FIG. 7/7A illustrates the floor plate 38/38A fully engaged with the magazine body 30 and the spring plate 36/36A. It will be appreciated that once fully loaded with ammunition that the follower 32 will be located lower in the magazine body 30, thereby compressing the spring 34 to apply a greater force to the spring plate 36/36A, thereby resisting removal of the floor plate 38/38A.

Figure 11:
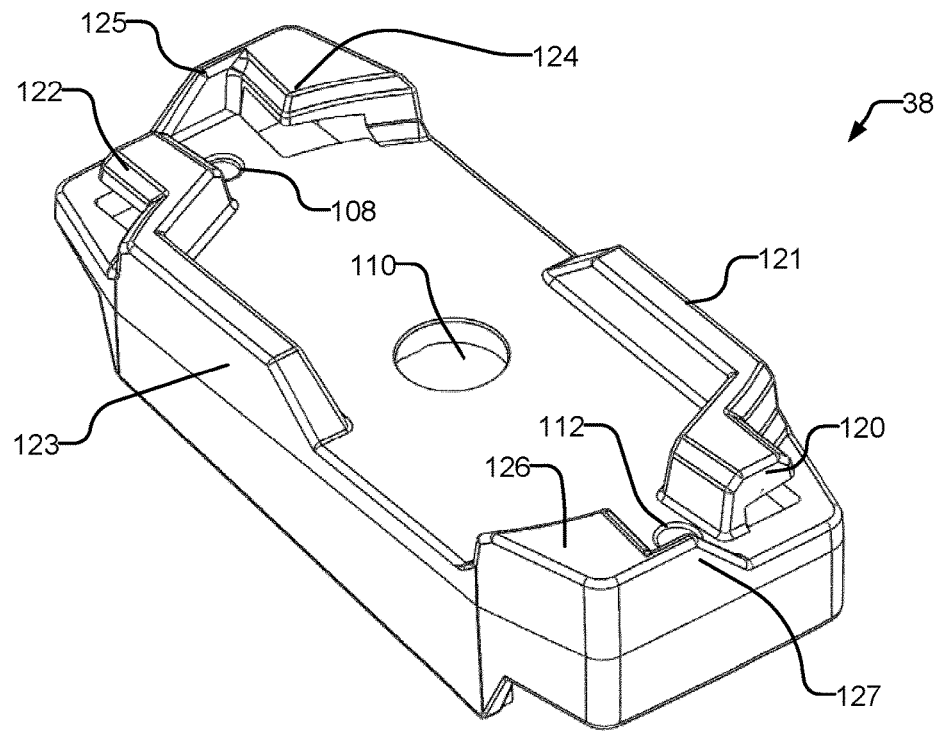
FIG. 11 is a perspective view of the bottom of the floor plate of FIG. 4.
Figure 12:
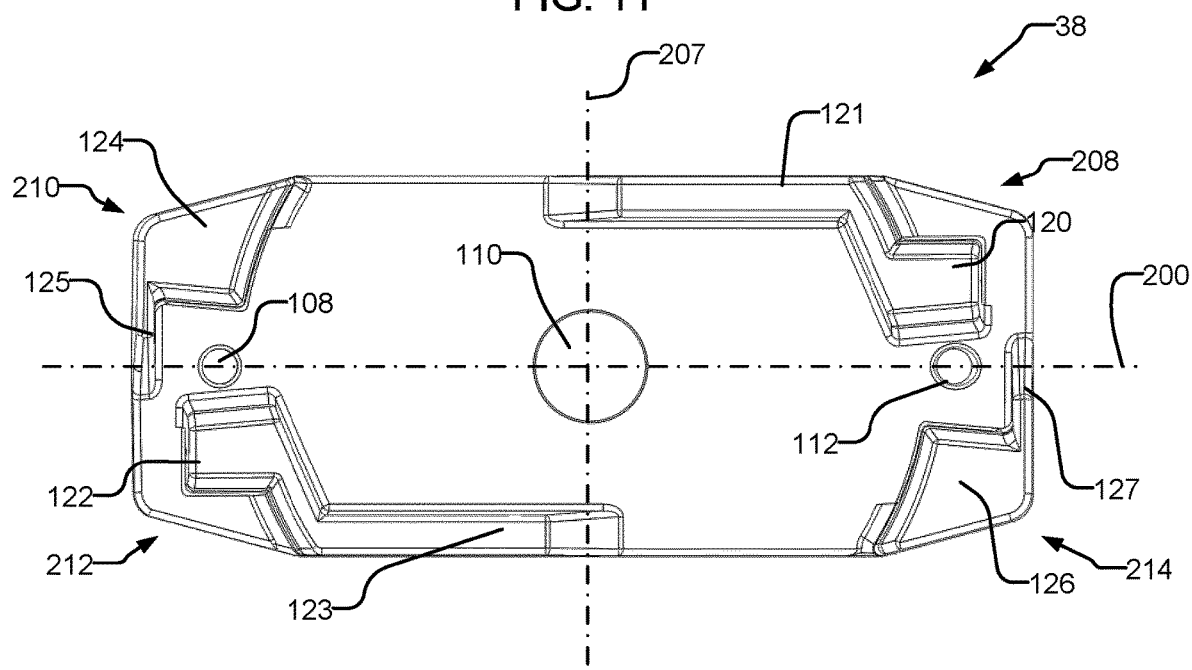
FIG. 12 is a bottom view of the floor plate of FIG. 4.
Figure 11A:
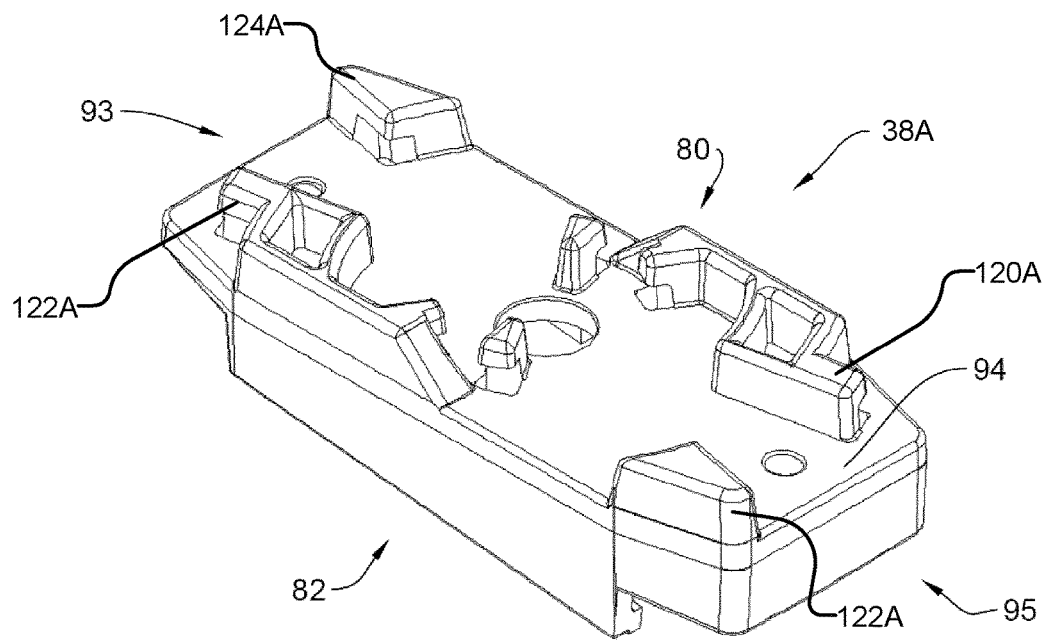
FIG. 11A is a perspective view of the bottom of the floor plate of FIG. 4A.
Figure 11B:
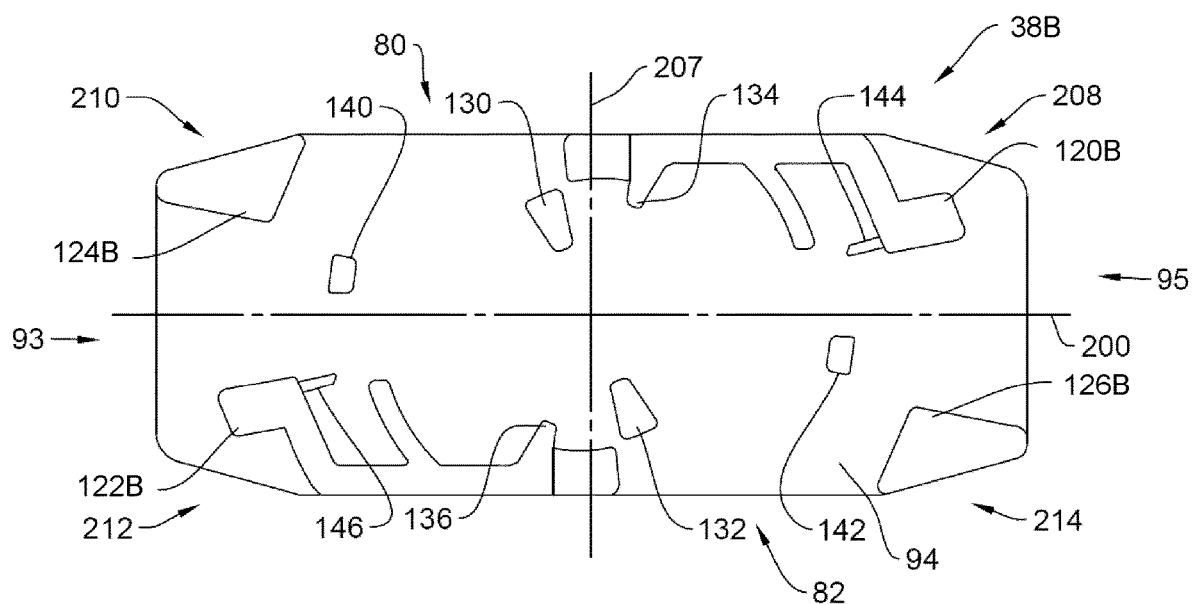
FIG. 11B is a bottom view of a floor plate according to another embodiment of the present invention.

Turning now to FIGS. 11, 11A, 11B and 12, FIGS. 11 and 12 show details of the mating face on the bottom of the floor plate 38, FIG. 11A shows details of the mating face on the bottom of the floor plate 38A, and FIG. 11B shows details of the bottom of a floor plate 38B with another alternative mating face. Each floor plate 38/38A/38B has a bottom surface 94 on plane 204 which comprises a mating face with a plurality of catches for locking to an identical mating face. In the illustrated examples, the catches are symmetrically arranged such that the mating faces can be coupled to one another in one of two opposed alignments (i.e., either with the first and second ends 93 and 95 of each floor plate respectively adjacent to the first and second ends 93 and 95 of the other floor plate, or with the first end 93 of one floor plate adjacent to the second and 95 of the other floor plate). Referring to FIGS. 11B and 12, centreline 200 separates first and second sides 80 and 82, and centreline 207 separates first and second ends 93 and 95. The mating face is divided into four quadrants: first quadrant 208, second quadrant 210, third quadrant 212 and fourth quadrant 214, as illustrated in FIGS. 11B and 12. The catches from the first and second quadrants 208 and 210 are rotated 180 degrees about the intersection of the centrelines 200 and 207, such that the catches from the first and third quadrants 208 and 212 are similar, and the catches in the second and fourth quadrants 210 and 214 are similar.

Figure 16:
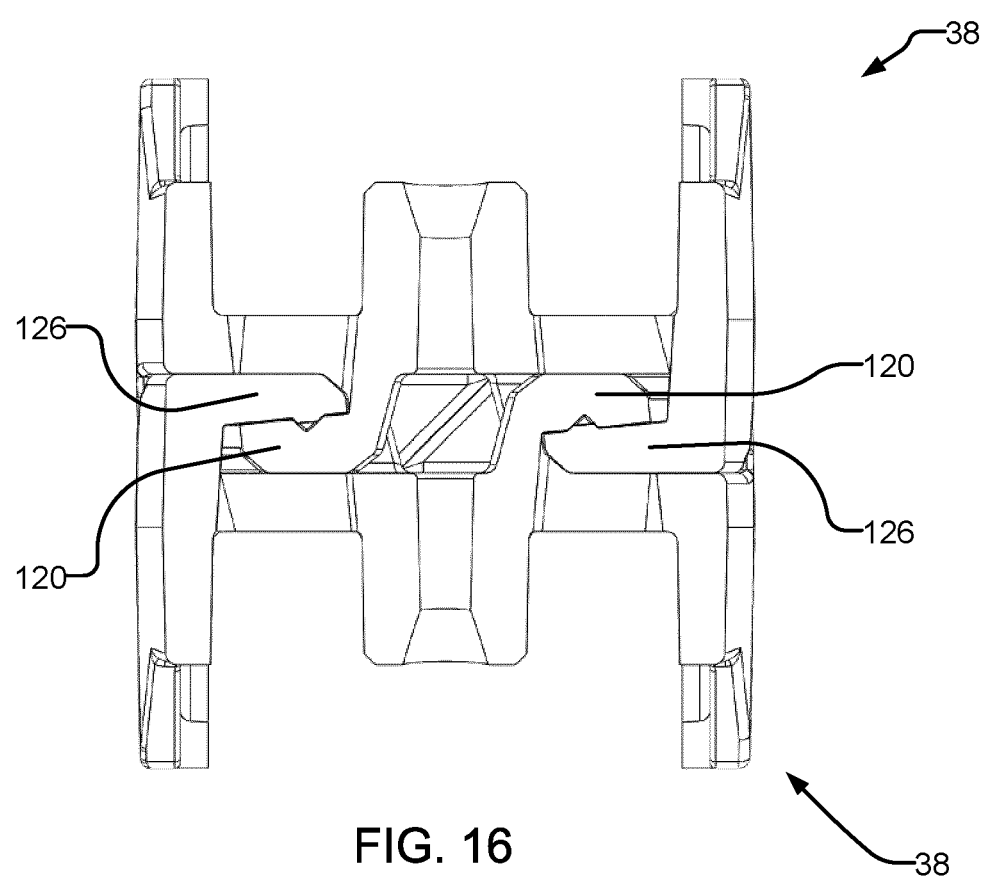
FIG. 16 is a cross section taken along line 16-16 of the coupled floor plates of FIG. 15.
Figure 17:
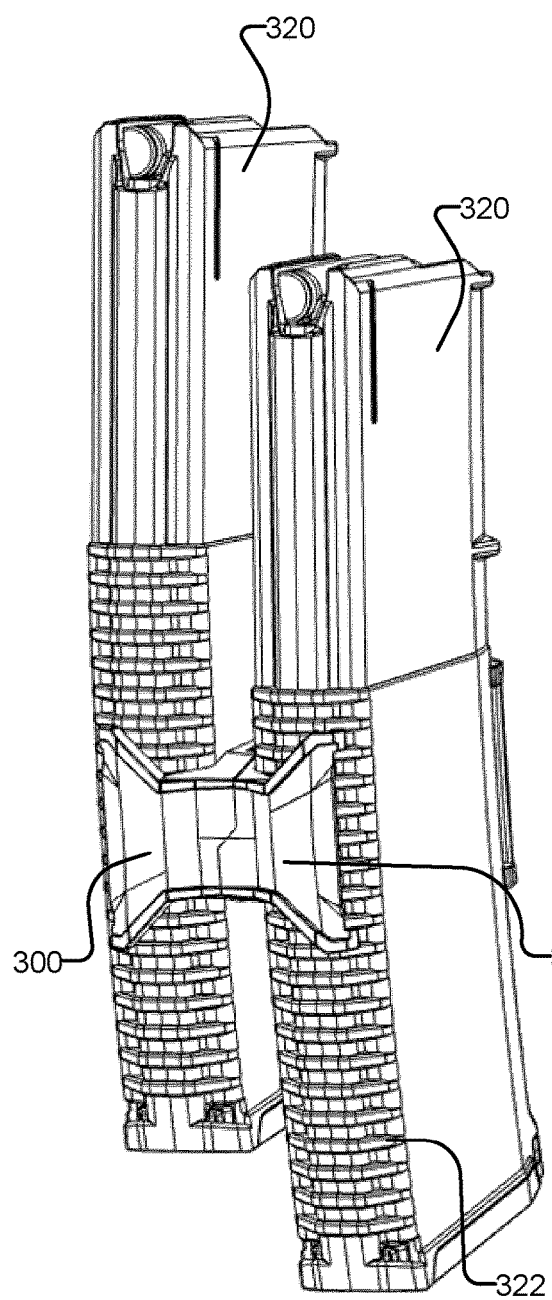
FIG. 17 shows two magazines coupled together by couplers in the form of clips according to one embodiment of the present disclosure.
Figure 17A:
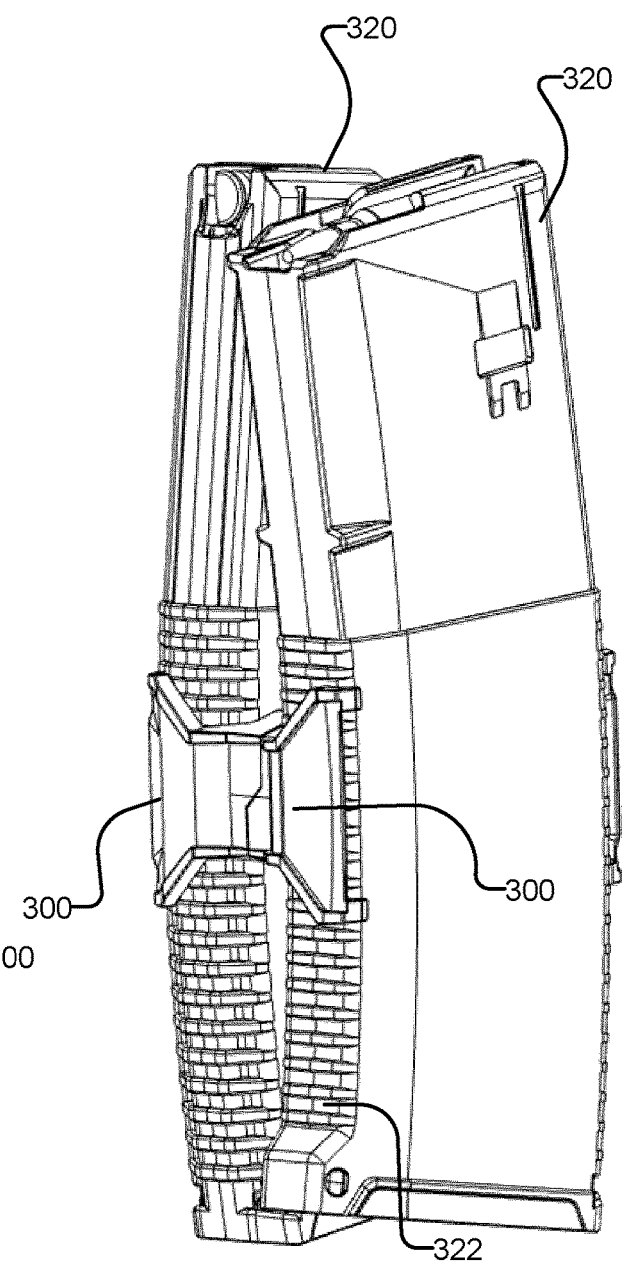
FIG. 17A shows two magazines facing opposite directions coupled together by the clips of FIG. 17.
Figure 17B:
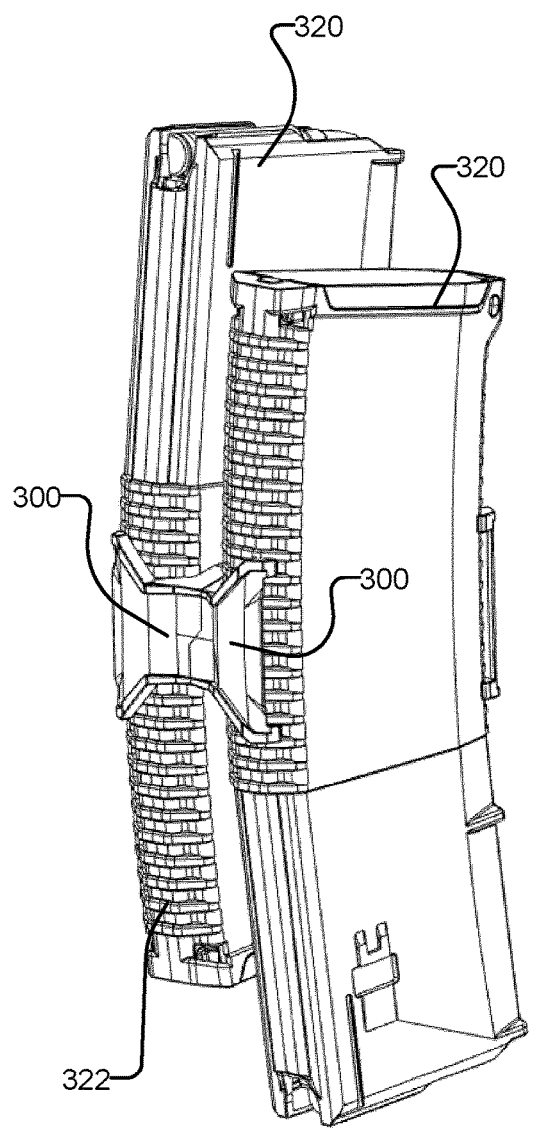
FIG. 17B shows two magazines facing the same direction coupled together by the clips of FIG. 17 with one magazine upright and the other upside down.
Figure 17C:
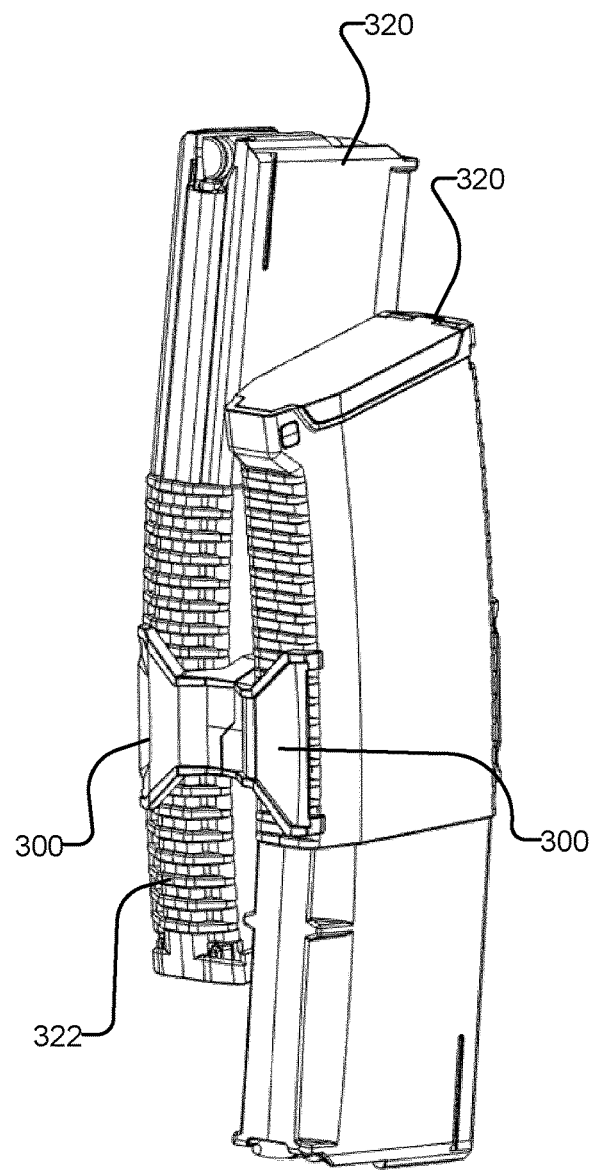
FIG. 17C shows two magazines facing opposite directions coupled together by the clips of FIG. 17 with one magazine upright and the other upside down.

In each floor plate 38/38A/38B the catches comprise outwardly pointing catches comprising a first outer ledge 120/120A/120B and a second outer ledge 122/122A/122B, and inwardly pointing catches comprising a first outer catch 124/124A/124B and a second outer catch 126/126A/126B. In the first quadrant 208, the first outer ledge 120/120A/120B is spaced apart from the bottom surface 94 with a gap thereunder facing outward toward first side 80. The second outer ledge 122/122A/122B in the third quadrant 212 is identical to the first outer ledge 120/120A/120B as rotated 180 degrees about the intersection of centrelines 200 and 207 similarly facing outward toward the second side 82. In the second quadrant 210, the first outer catch 124/124A/124B is spaced apart from the bottom surface 94 with a gap therebetween facing inward and is sized and positioned to mate with first or second outer ledges 120/120A/120B and 122/122A/122B such that each ledge or catch is located within the opposite gap. In the fourth quadrant 214, the second outer catch 126/126A/126B is spaced apart from the bottom surface 94 with a gap therebetween facing toward the centreline 200 and is sized and positioned to mate with first or second outer ledges 120/120A/120B and 122/122A/122B such that each ledge or catch is located within the opposite gap. In the embodiment of FIGS. 11 and 12, the first and second outer ledges 120 and 122 and first and second outer catches 124 and 126 are the only catches on the mating face, and are sufficient to lock the mating face into engagement with another identical mating face. All ledges and catches are generally formed as an upstanding wall from the bottom surface 94 with a ridge at the distal end sized to fit within the gap below the ridge of the corresponding ledge or catch when two mating faces are facewise connected, as seen in FIG. 16, and as further set out below.

Figure 15:
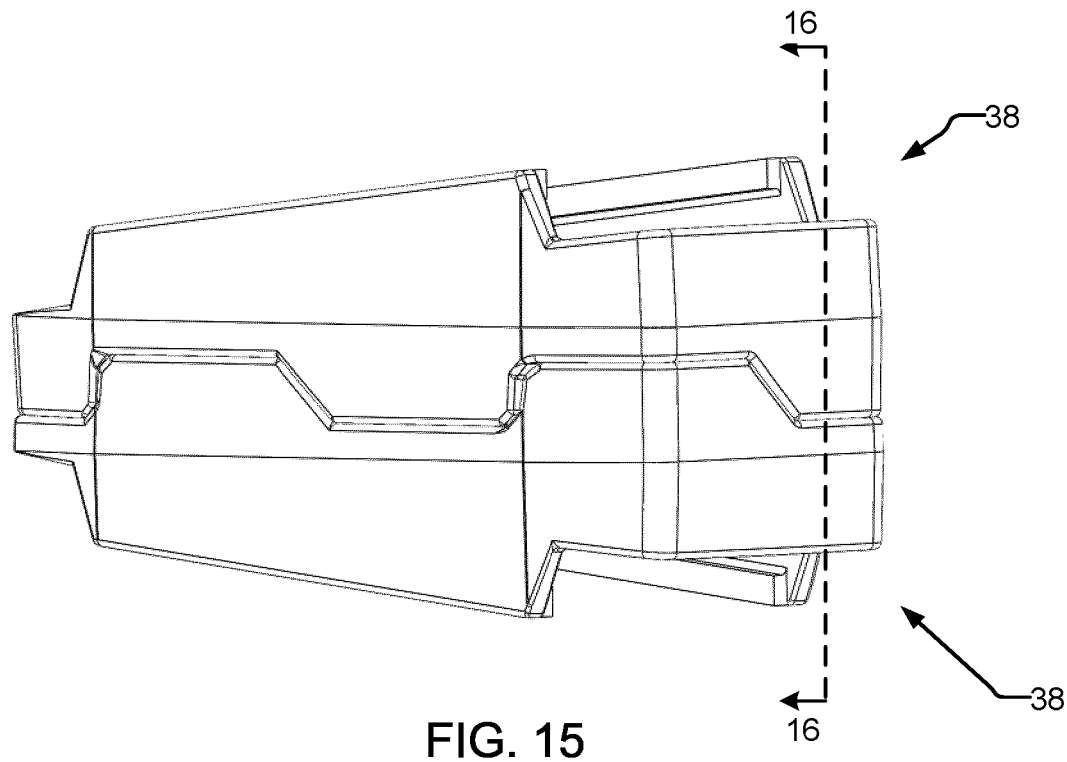
FIG. 15 is a side view of two floor plates according to the FIG. 4 embodiment coupled together.

In the embodiment of FIGS. 11 and 12, peripheral ridge portions 121 and 123 extend along the edges of the mating face from the first and second outer ledges 120 and 122 respectively, and peripheral ridge portions 125 and 127 extend along the edges of the mating face from the first and second outer catches 124 and 126 respectively. These peripheral ridge portions 121, 123, 125 and 127 collectively extend around one half of the periphery of the mating face, such that when two mating faces are coupled together, the peripheral ridge portions of the mating faces cooperate to leave substantially no gaps at the peripheral interface between the two mating faces, as best seen in FIG. 15.

In the embodiment of FIGS. 11A and 11B, in the second quadrant 210, a first inner ledge 130 is spaced apart from the bottom surface 94 with a gap therebetween facing outward toward the first side 80. A second inner ledge 132 in fourth quadrant 214 similarly is spaced apart from the bottom surface 94 with a gap 10 therebetween facing outward toward the second side 82. In first quadrant 208, a first inner catch 134 is spaced apart from the bottom surface 94 with a gap therebetween facing toward the centreline 200 and is sized and positioned to mate with first or second inner ledges 130 and 132 such that each ledge or catch is located within the opposite gap. In third quadrant 212, a second inner catch 136 is sized and positioned to mate with first or second inner ledges 130 and 132 such that each ledge or catch is located within the opposite gap. As seen in FIG. 11B, an optional first block 140 extends from the bottom surface 94 in second quadrant 210 while an optional second block 142 extends from the bottom surface 94 in fourth quadrant 214. A first stop 144 extends from the bottom surface 94 in first quadrant 208 and is sized and positioned to meet with either first or second block 140 and 142 when two floor plates 38B are coupled together. A second stop 146 extends from the bottom surface 94 in third quadrant 212 and is sized and positioned to meet with either first or second block 140 and 142 when two floor plates 38B are coupled together. It may be appreciated that some of the catches as illustrated in the example embodiments of the invention are optional, and other configurations may be useful, as well.

As illustrated in FIG. 4, coupler plane angle 206 separates top plane 202 from bottom plane 204 of floor plate 38/38A. When coupler plane angle 206 is greater than 0 degrees, the distance between top surface 92 and bottom surface 94 is smaller at first end 93 than at second end 95 so as to angularly orient two magazine bodies 30 relative to each other. The coupler plane angle 206 may be selected to be any angle as desired by a user, such as, by non-limiting example, between 0 and 90 degrees. In some embodiments, the coupler plane angle 206 is in the range of 1 to 45 degrees. In some embodiments, the coupler plane angle 206 is in the range 1 to 30 degrees.

Figure 3A:
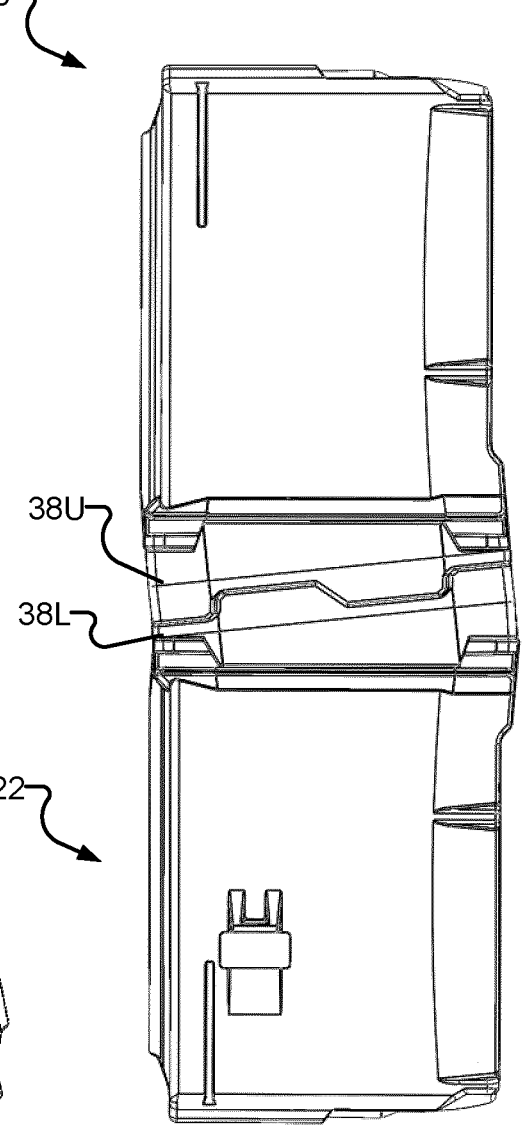
FIG. 3A is a side view of two coupled magazines, with the couplers aligned in opposite directions and the magazines aligned in the same direction.

FIGS. 2, 2A, 3 and 3A illustrate the four possible configurations to couple two floor plates, 38U and 38L together. Top floor plate 38U and bottom floor plate 38L may be identical, but are identified separately to differentiate between the floor plate 38U of the engaged top magazine 20 and the bottom floorplate 38L of the disengaged bottom magazine 22. In FIG. 2, the coupled magazines 20 and 22 face the same direction and the two floor plates 38U and 38L are coupled such that the first ends 93 are aligned together, and the second ends 95 are aligned together. The result of this alignment is that the coupled magazines, 20 and 22, essentially form a curved outer profile. In FIG. 2A, the coupled magazines 20 and 22 face opposite directions and the two floor plates 38U and 38L are coupled such that the first ends 93 are aligned together, and the second ends 95 are aligned together. In FIG. 3, the coupled magazines 20 and 22 face opposite directions and the two floor plates 38U and 38L are coupled such that that the top floor plate 38U first end 93 is aligned with the bottom floor plate 38L second end 95, and the top floor plate 38U second end 95 is aligned with the bottom floor plate 38L first end 93. The result of the alignment shown in FIG. 3 is that the coupled magazines, 20 and 22, essentially form a straight outer profile. In FIG. 3A, the coupled magazines 20 and 22 face the same direction and the two floor plates 38U and 38L are coupled such that that the top floor plate 38U first end 93 is aligned with the bottom floor plate 38L second end 95, and the top floor plate 38U second end 95 is aligned with the bottom floor plate 38L first end 93. The benefit of having the ability to create alternate profiles is user preference. As set out above, a magazine body 30 may be connected onto a floor plate 38 from either direction, permitting the user to select the relative orientation of the coupled magazines 20 and 22. FIG. 2 illustrates both magazine bodies 30 oriented such that both front ends 60 are aligned with first ends 93 of the floorplates 38, although it may be appreciated that both rear ends 62 of the magazine bodies 30 may be aligned with first ends 93 of the floorplates 38, or one front end 60 of one magazine body 30 may be aligned with the first end 93 of its floorplate 38, while the other front end 60 of the second magazine body 30 may be aligned with the second end 95 of its floorplate 38, for a total of three possible configurations with the first floorplate coupling configuration illustrated in FIG. 2. Similarly, FIG. 3 is illustrated with both front ends 60 of the magazine bodies 30 aligned with both first ends 93 of the floorplates 38, but they may be assembled in other configurations, as well, for a total of three possible configurations with the second floorplate coupling configuration illustrated in FIG. 3.

Figure 13:
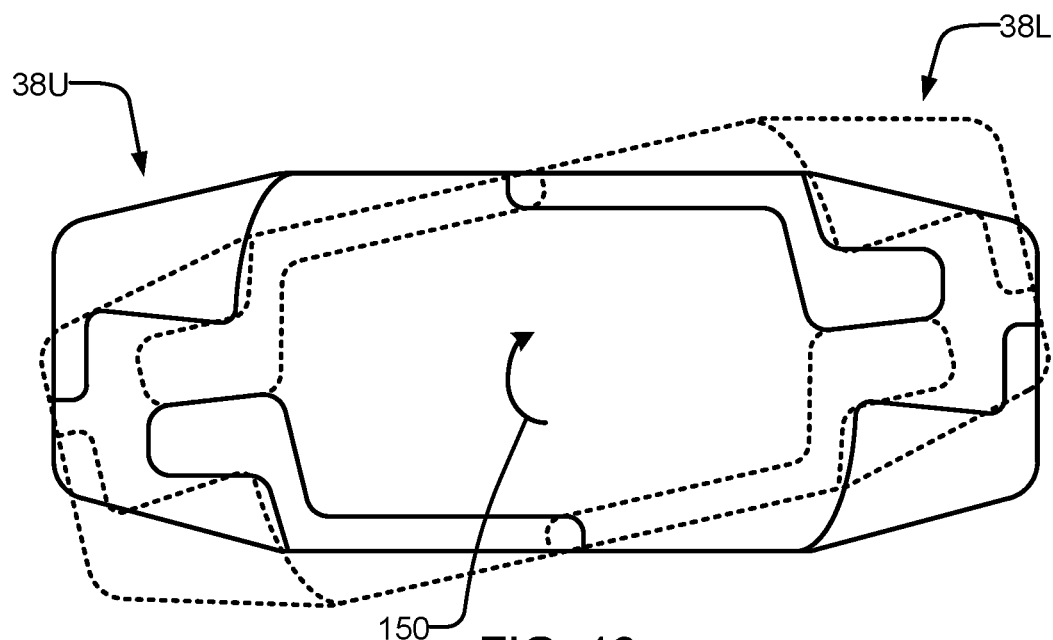
FIG. 13 is a bottom view of the floor plate of FIG. 4, aligned to couple with a second floor plate.
Figure 14:
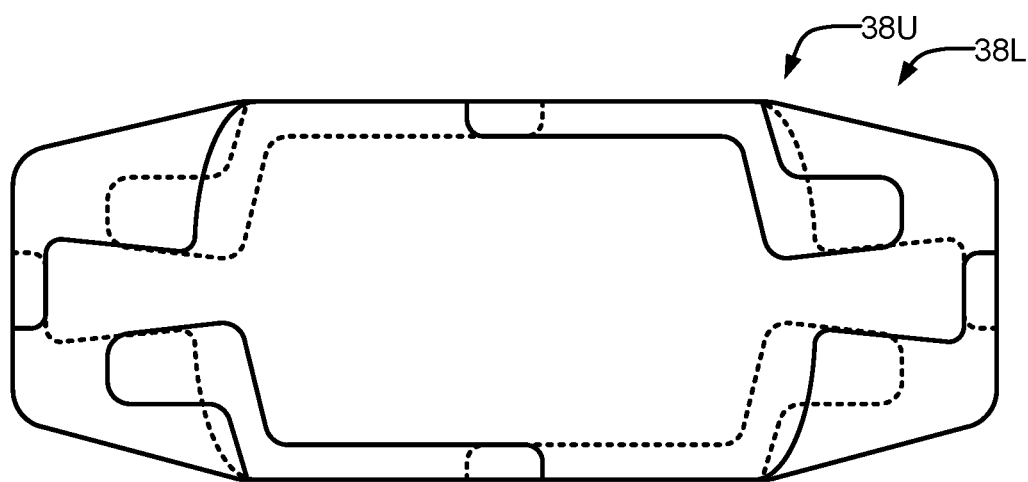
FIG. 14 is a bottom view of the floor plate of FIG. 4, fully coupled with a second floor plate.
Figure 13A:
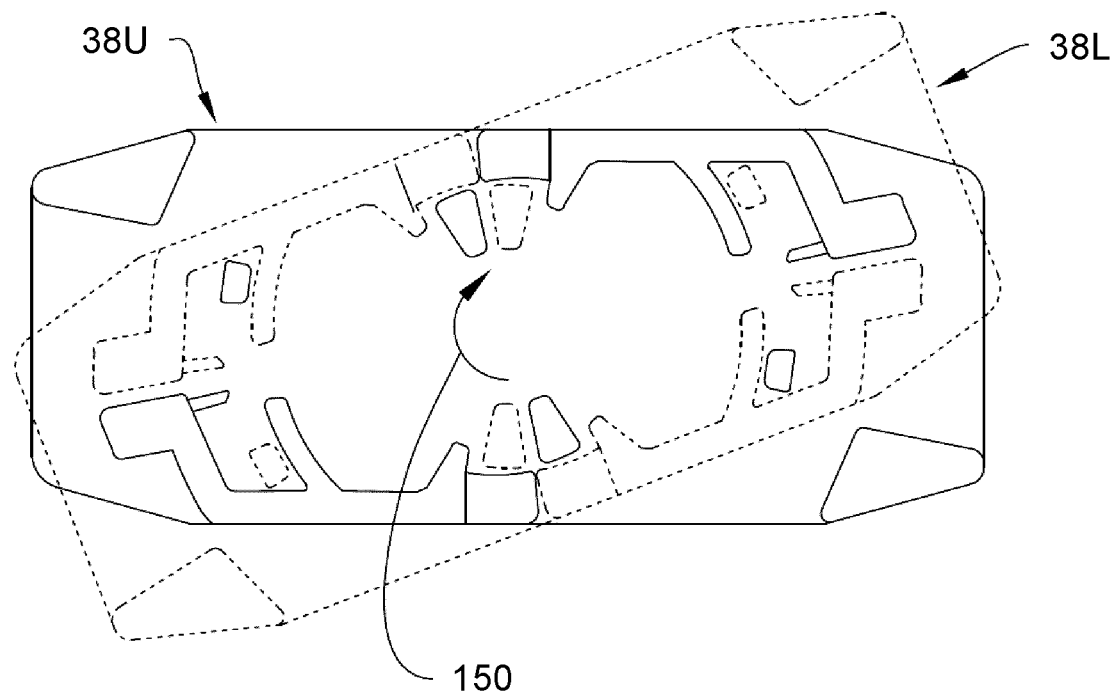
FIG. 13A is a bottom view of the floor plate of FIG. 11B, aligned to couple with a second floor plate.
Figure 14A:
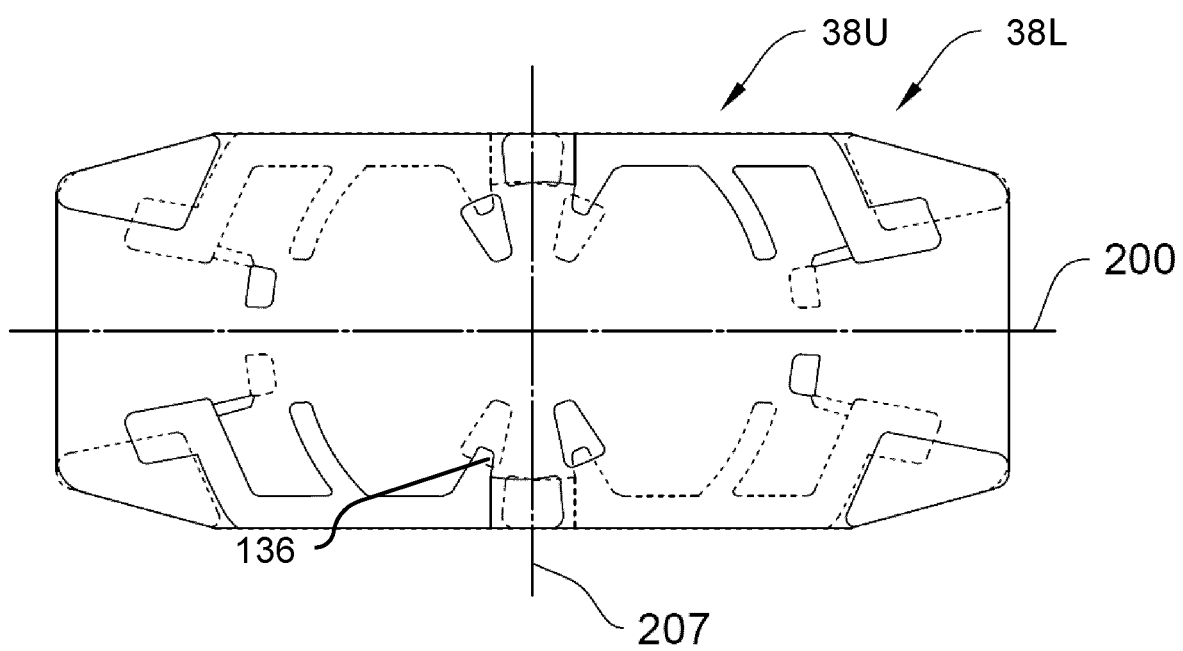
FIG. 14A is a bottom view of the floor plate of FIG. 11B, fully coupled with a second floor plate.

To couple two floor plates 38 together, the mating faces are aligned to face each other at an offset angle, as shown in FIG. 13, with the centres of both mating faces aligned. The mating faces are then rotated together in the direction generally indicated by arrow 150. FIG. 14 illustrates two mating faces locked in the engaged position, and best shows the engagement of ledges and catches described above. To disengage the mating faces, rotate in the opposite direction and pull apart. FIGS. 13A and 14A illustrate coupling of two floor plates 38A together, which may be accomplished in the same manner as the coupling of floor plates 38.

Various methods and materials may be used to manufacture the magazine body 30, follower 32, spring plate 36/36A and floor plate 38/38A, such as by way of non-limiting example injection mould, casting or cold punch.

FIGS. 17, 17A, 17B and 17C show two magazines 320 coupled together by couplers in the form of clips 300 according to another embodiment of the present invention. As described below, each clip 300 comprises a mating face which may be substantially similar to the mating face of the floor plate 38 described above.

Figure 18:
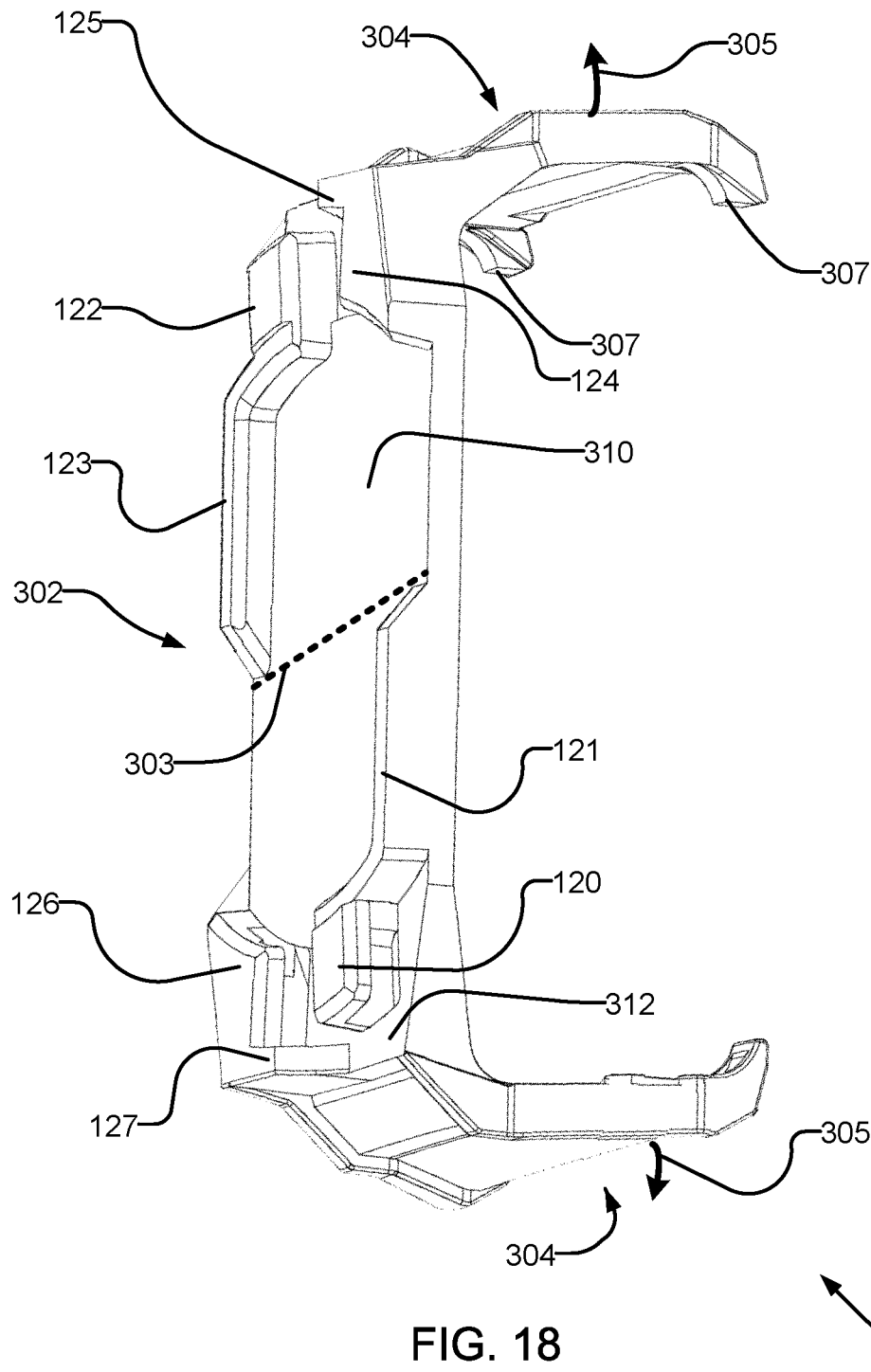
FIG. 18 show a clip coupler according to one embodiment of the present disclosure in isolation.

As best seen in FIG. 18, the clip 300 comprises a clip body 302 with a first side that bears against the body of the magazine 320, and a second side comprising a mating face configured to be coupled to another identical mating face. Clip arms 304 extend from the first side of the clip body 302 for engaging the magazine 320. Each clip arm 304 comprises a pair of protrusions 307 which are configured to be received in grooves 322 on the outside of a magazine 320. In some embodiments, the magazine 320 has grooves 322 along a substantial portion of its length to permit indexing of the clip 300 at a plurality of positions along the length of the magazine 320. The clip body 302 comprises a thin area 303 in a central portion thereof to allow the clip 300 to be flexed at the thin area such that the clip arms 304 can be pulled apart, as indicated by arrows 305, for attachment to and removal from the magazine 320. The peripheral ridge portions 121 and 123 of the mating face of the clip 300 each extend partially across the central portion of the clip body 302 such that when two clips 300 are coupled together, as shown in any of FIG. 17, 17A, 17B or 17C, these central peripheral ridge portions 121 and 123 of the engaged mating faces prevent flexing of the clip body 302 so as to prevent removal of the clips 300 from the magazines 320.

Figure 19:
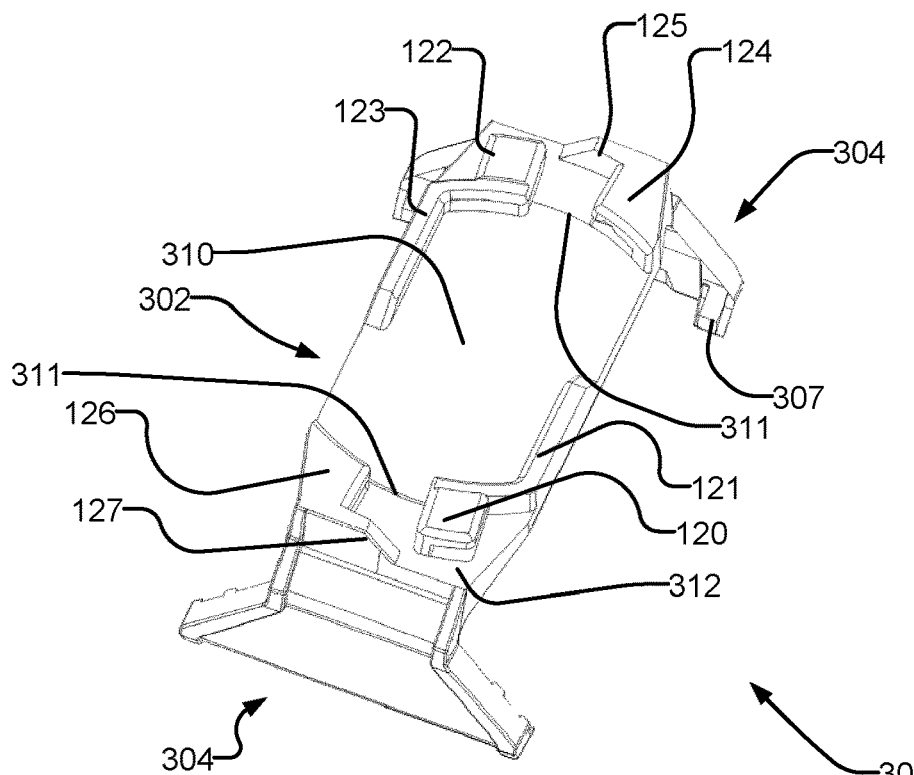
FIGS. 19 and 20 show the clip coupler of FIG. 18 from different angles.
Figure 20:
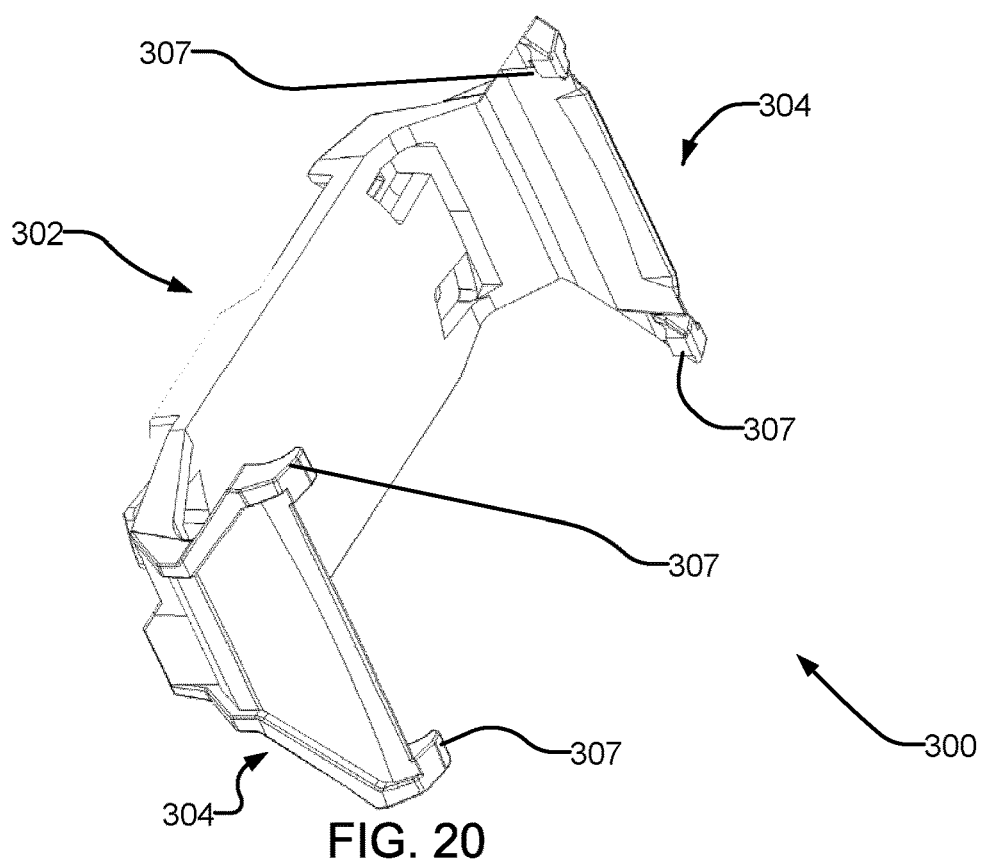

The mating face on the second side of the clip body 302 may be substantially similar to the mating face of the floor plate 38 described above in some embodiments. In the example illustrated in FIGS. 18-20, the mating face on the second side of the clip body 302 is slightly different from the mating face of the floor plate 38 shown in FIGS. 11 and 12, in that a central surface 310 of the mating face is on a parallel but offset plane from an outer surface 312 at either end. As best seen in FIG. 19, this results in a step-down transition 311 between the central surface 310 and the outer surfaces 312, and necessitates a similar step-down transition (not separately enumerated) between the first and second outer ledges 120 and 122 and adjacent peripheral ridge portions 121 and 123. The difference in levels between the central surface 310 and the outer surfaces 312 facilitates alignment of the mating faces of two couplers for coupling together. In some embodiments, a floor plate-type coupler may have a mating face with the offset central surface 310 and outer surfaces 312 shown in FIG. 18-20.

While specific embodiments of the invention have been described and illustrated, such embodiments should be considered illustrative of the invention only and not as limiting the invention as construed in accordance with the accompanying claims.

The present disclosure may be embodied in other specific forms without departing from its spirit or essential characteristics. The described embodiments are to be considered in all respects only as illustrative and not restrictive.

The invention claimed is:

1. An apparatus for coupling a firearm magazine to another, firearm magazine the apparatus comprising a coupler mounted on the magazine, the coupler comprising a generally rectangular mating face having a plurality of catches thereon, the plurality of catches comprising at least one complementary pair of catches positioned and shaped to be engaged with corresponding catches of another coupler having an identical mating face when mating faces of two couplers are facewise engaged with and rotated relative to each other to align with each other, wherein the catches are rotationally symmetrically arranged about a central axis through an intersection of a longitudinal centerline bisecting the mating face along a first direction and a transverse centerline bisecting the mating face along a second direction perpendicular to the first direction, wherein the centerlines divide the mating face into four quadrants, and the catches of adjacent quadrants are different and the catches of opposed quadrants are substantially identical, such that two couplers are only attachable to each other in one of two opposed alignments.

2. The apparatus of claim 1 wherein the catches comprise an inwardly pointing catch and an outwardly pointing catch at each of two opposed ends of the coupler.

3. The apparatus of claim 1 wherein said catches are arranged in pairs diagonally across said central axis from each other.

4. The apparatus of claim 3 wherein at least one pair of said catches comprise inwardly extending catches having engagement surfaces extending radially outwardly from said central axis and wherein at least one pair of said catches comprise outwardly extending catches having engagement surfaces extending radially outwardly from said central axis.

5. The apparatus of claim 4 wherein said inwardly extending catches engage with a corresponding outwardly extending catch across a longitudinal centerline of said floor plate in a first configuration and with a corresponding outwardly extending catch across a transverse centerline of said floor plate in a second configuration.

6. The apparatus of claim 1 wherein the mating face comprises peripheral ridge portions collectively extending around half of a periphery of the coupler such that the peripheral ridge portions of a pair of couplers coupled together collectively extend around all of a periphery of an interface between the pair of couplers.

7. The apparatus of claim 6 wherein the mating face comprises a central surface and a pair of outer surfaces with one outer surface at each of two opposed ends of the mating face, wherein the outer surfaces are parallel to and offset relative to the central surface to facilitate alignment of the mating face with the mating face of another coupler.

8. The apparatus of claim 1 wherein the coupler comprises a floor plate adapted to be secured to a bottom of a magazine body.

9. The apparatus of claim 8, wherein the floor plate has a top surface for bearing against a magazine spring plate and a bottom surface comprising the mating face.

10. The apparatus of claim 9 wherein said top and bottom surfaces of said floor plate have an angle in the range of 1 to 45 degrees.

11. The apparatus of claim 9 wherein said floor plate is adapted to be slidably received upon a bottom end of a casing of each of said magazine.

12. The apparatus of claim 11 wherein said floor plate includes horizontally opposed ridges adapted to be received within slots on said magazine.

13. The apparatus of claim 12 wherein said floor plate includes at least one aperture adapted to receive a protrusion extending from said spring plate therein so as to retain said floor plate on said magazine body.

14. The apparatus of claim 8 wherein said floor plate retains a spring plate within said magazine body.

15. The apparatus of claim 1 wherein the coupler comprises a clip adapted to clip onto an outside of a magazine body.

16. The apparatus of claim 15 wherein the clip comprises a clip body having a first side for bearing against the magazine body and a second side comprising the mating face, wherein a clip arm extends from the first side of the clip body at each of two opposed ends of the clip body.

17. The apparatus of claim 16 wherein a central portion of the clip body comprises a thin area providing flexibility to the clip body to permit the clip arms to be pulled apart to fit over the magazine body.

18. The apparatus of claim 17 wherein the mating face comprises two central peripheral ridge portions each extending partially across a central portion of the mating face, the central portion of the mating face being aligned with the central portion of the clip body, such that when two clip bodies are coupled together they are not flexible.

19. The apparatus of claim 16 wherein the clip arms comprise inwardly extending protrusions at ends thereof configured to be received in grooves in the outside of the magazine body to facilitate indexing of the clip at any of a plurality of positions along a length of the magazine body.

20. A magazine comprising:
    a magazine body extending between top and bottom ends having an interior passage therein extending to an open end at said bottom of said magazine body;
    a follower slidably located within said interior passage of said magazine body;
    a magazine spring located within said interior passage of said magazine body below said follower;
    a spring plate sized to be slidably received within said interior passage of said magazine body; and
    a floor plate comprising a coupler of claim 1 slidably receivable upon said bottom of said magazine body.

21. The magazine of claim 20 wherein said magazine body includes slots extending transversely to a longitudinal axis at a position proximate to said bottom end thereof adapted to engage corresponding ridges in said floor plate.

22. The magazine of claim 20 wherein said spring plate includes at least one protrusion extending therefrom adapted to be received in at least one corresponding depression in said floor plate.

* * * * *